(12) United States Patent
Jindal et al.

(10) Patent No.: US 10,685,470 B2
(45) Date of Patent: Jun. 16, 2020

(54) GENERATING AND PROVIDING COMPOSITION EFFECT TUTORIALS FOR CREATING AND EDITING DIGITAL CONTENT

(71) Applicant: Adobe Inc., San Jose, CA (US)

(72) Inventors: Amol Jindal, Patiala (IN); Vivek Mishra, Vasant Kunj (IN); Neha Sharan, Noida (IN); Anmol Dhawan, Indirapuram (IN)

(73) Assignee: ADOBE INC., San Jose, CA (US)

( * ) Notice: Subject to any disclaimer, the term of this patent is extended or adjusted under 35 U.S.C. 154(b) by 37 days.

(21) Appl. No.: 16/128,904

(22) Filed: Sep. 12, 2018

(65) Prior Publication Data

US 2020/0082586 A1    Mar. 12, 2020

(51) Int. Cl.
*G09G 5/00* (2006.01)
*G06T 11/60* (2006.01)
*G06F 9/451* (2018.01)
*G06F 16/58* (2019.01)

(52) U.S. Cl.
CPC ............. *G06T 11/60* (2013.01); *G06F 9/453* (2018.02); *G06F 16/58* (2019.01); *G06T 2200/24* (2013.01); *G06T 2200/36* (2013.01)

(58) Field of Classification Search
CPC .......... G06F 9/453; G06F 16/58; G06T 11/60; G06T 2200/24
See application file for complete search history.

(56) References Cited

U.S. PATENT DOCUMENTS

2017/0256084 A1* 9/2017 Iglehart .............. G06K 9/00221
2019/0014884 A1* 1/2019 Fu ........................ A45D 44/005

OTHER PUBLICATIONS dos Santos et al., XTemplate 3.0: Spatio-Temporal Semantics and Structure Reuse for Hypermedia Compositions, Multimedia Tools and Applications, vol. 61, Issue 3, Dec. 2012 (Year: 2012).*

* cited by examiner

Primary Examiner — Charles Tseng
(74) Attorney, Agent, or Firm — Keller Jolley Preece

(57) ABSTRACT

The present disclosure relates to systems, methods, and non-transitory computer readable media for generating and providing composition effect tutorials for creating and editing digital content based on a metadata composite structure. For example, the disclosed systems can generate and/or access a metadata composite structure that includes nodes corresponding to composition effects applied to a digital content item, where a given node can include location information indicating where a composition effect is applied relative to a digital content item. The disclosed systems can further generate a tutorial to guide a user to implement a selected composition effect by identifying composition effects of nodes that correspond to a location selected within a composition interface and presenting instructions for a particular composition effect.

20 Claims, 16 Drawing Sheets

GENERATING AND PROVIDING COMPOSITION EFFECT TUTORIALS FOR CREATING AND EDITING DIGITAL CONTENT

BACKGROUND

Advancements in software and hardware platforms have led to a variety of improvements in systems for assisting users in editing digital content. For example, digital content editing systems are now able to provide instructions for recreating specific digital images from start to finish. Amid efforts to improve the detail of assistance in guiding users to create and edit digital content, conventional digital content editing systems have been developed that can show the final output at various steps in the process of reproducing a digital image or design.

Despite these advances however, conventional digital content editing systems continue to suffer from a number of disadvantages, particularly in their accuracy, efficiency, and flexibility. For example, although many conventional digital content editing systems can illustrate outputs at various stages in the creation process, these systems nevertheless consider an entire composition as a monolithic entity. Thus, many systems that instruct users on how to generate final outputs of digital images fail to provide the necessary granularity to teach users how to implement various composition effects in detail. These systems therefore inaccurately guide users through the process of creating and/or editing their own individual digital content.

In addition, conventional digital content editing systems are also inefficient. Indeed, because many conventional systems fail to provide the requisite detail for implementing specific composition effects, these systems require an inordinate amount of time for users to sift through tutorials to find desired portions. Even assuming that a user finds a tutorial that matches the appropriate version of a software application, the user is still required to determine which steps of the tutorial are relevant and then remember how to reproduce those steps independently. For example, some conventional systems require users to watch a video tutorial for creating a digital image that includes various composition effects. Upon watching the video, the user is required to determine which sections of the video are relevant for the user's own project and to reproduce the steps shown in the video to implement composition effects.

Moreover, some conventional digital content editing systems are inflexible. For example, due to the fact that conventional systems illustrate generating already-created digital content items from start to finish, these systems cannot flexibly generate tutorials for implementing composition effects adapted to a user's own project. Thus, conventional systems fail to adapt to different items of digital content to flexibly guide users through tutorials for implementing composition effects.

As a result of the inaccuracy, inefficiency, and inflexibility of conventional digital content editing systems, many of these systems suffer from a lack of customer retention. Indeed, many users of conventional systems find it difficult to discern which editing tools are applicable for recreating a particular composition effect in a digital image. Beyond this, users also find many editing tools too complex and the instructions for using them too convoluted to effectively learn to implement them in the future. Thus, due to the above-mentioned shortcomings, conventional systems often struggle to retain users.

Thus, there are several disadvantages with regard to conventional digital content editing systems.

SUMMARY

One or more implementations described herein provide benefits and solve one or more of the foregoing or other problems in the art with systems, methods, and non-transitory computer readable media that generate and provide end-to-end location-aware guided tutorials. The disclosed systems can determine composition effects applied at any location within a digital content item (e.g., a digital image) and provide a way for a user to access a tutorial for implementing the composition effects at a selected location. For example, the disclosed systems map composition effects with a metadata structure to capture information such as areas on which composition effects are applied, identifiers associated with tools corresponding to composition effects, and other composition effect attributes. Indeed, the disclosed systems can generate and access a metadata composite structure for a digital content item and that includes nodes arranged in a hierarchy corresponding to different composition effects. Each node of the metadata composite structure can correspond to a composition element or a composition effect within the digital content item and can include various information such as location information, an identifier, and/or other composite effect attribute information. Thus, upon receiving a selection of a location within a composition interface, the disclosed systems can determine a composition effect that corresponds to the location of the selection and can generate a tutorial for the composition effect.

Additional features and advantages of the present application will be set forth in the description which follows, and in part will be obvious from the description, or may be learned by the practice of such example implementations.

BRIEF DESCRIPTION OF THE DRAWINGS

This disclosure will describe one or more implementations of the invention with additional specificity and detail by referencing the accompanying figures. The following paragraphs briefly describe those figures, in which.

DETAILED DESCRIPTION

Figure 1:
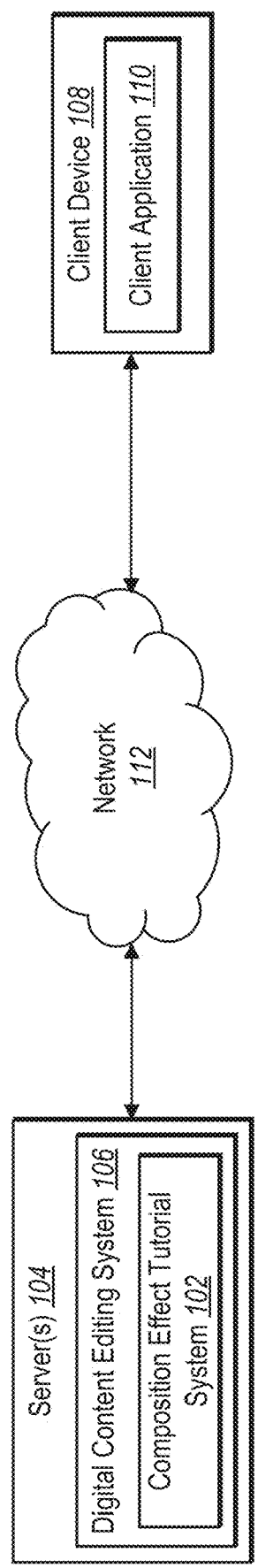
FIG. 1 illustrates an example environment for implementing a composition effect tutorial system in accordance with one or more implementations.

One or more implementations include a composition effect tutorial system that allows a user to selectively access tutorials for individual composition effects based on location within the composition. For example, the composition effect tutorial system generates an organized hierarchy of composition metadata including areas on which composition effects are applied, identifiers associated with tools corresponding to composition effects, and other composition effect attributes. The composition effect tutorial system can thus, based on a selection indicating a location within a composition interface, generate and/or present a tutorial for implementing a composition effect corresponding to the selected location.

For example, a user can access a digital image or design comprising a plurality of composition effects. The user can decide they want to learn how to perform one of the composition effects. The user can then select the desired composition effect by clicking on a location of the digital image or design where the composition effect is located. In response, the composition effect tutorial system can access the metadata structure for the digital image or design and map the location of the selection to node associated with the location. Based on the node, the composition effect tutorial system can identify one or more corresponding composition effects based on the metadata structure and generate a tutorial showing how to recreate the one or more composition effects.

To generate tutorials for implementing composition effects, the composition effect tutorial system generates and/or access a metadata composite structure—i.e., a DCX composite structure. To illustrate, in one or more implementations, the composition effect tutorial system generates a metadata composite structure that includes various metadata associated with a given digital content item. For example, the composition effect tutorial system generates a metadata composite structure that maps various composition effects applied to the digital content item. To elaborate, the composition effect tutorial system can generate a metadata composite structure that includes a node for each composition effect applied to a given digital content item. Thus, for a digital image with a contrast effect and a warped text added to the digital image, the composition effect tutorial system can generate a metadata composite structure that includes a node for the contrast effect, a node for the text added to the digital image, and a third node for the warping of the text.

In some implementations, the composition effect tutorial system generates the metadata composite structure to have a hierarchical nature such that some nodes are child nodes (or dependent nodes) of other nodes. Indeed, for composition effects that modify or complement other composition effects, the composition effect tutorial system can generate corresponding child nodes to include within the metadata composite structure. Additional detail regarding hierarchical relationships between nodes of the metadata composite structure is provided below with reference to the figures.

Within a given node of the metadata composite structure, the composition effect tutorial system can generate and include various information. For example, the composition effect tutorial system generates a node to include location information that indicates locations within the digital content item and/or composition interface where a corresponding composition effect is applied. Indeed, composition effects can be applied to an entire digital content item or to only a section or portion of the digital content item. For instance, a contrast effect could be applied to an entire digital image, whereas a warped text phrase could be added to only a particular portion of the digital image. Thus, the composition effect tutorial system determines the locations of the composition effects applied to the digital image. Based on these locations, the composition effect tutorial system generates corresponding nodes with coordinate location information indicating the respective locations of the corresponding composition effects.

The composition effect tutorial system can further determine an identifier associated with a given composition effect. For instance, the composition effect tutorial system determines labels to apply to each composition effect and can include such labels or identifiers within nodes of the metadata composite structure. Indeed, the composition effect tutorial system can generate a node that includes an identifier indicating a contrast effect or a contrast tool (e.g., "contrast tool" or "contrast") as well as the location or position associated with the contrast effect (e.g., {x, y, width, height}). Additional detail regarding the location information and the identifiers associated with the metadata composite structure is provided below with specific reference to the figures.

In addition, the composition effect tutorial system can determine other information associated with composition effects. For example, the composition effect tutorial system determines attributes of various composition effects such as value, color, intensity, opacity, font type, font size, hue, saturation, bend, rotation, and others. Thus, the composition effect tutorial system generate nodes for the metadata composite structure that include information indicating the various attributes that affect the appearance of particular composition effects.

Based on the location information, identifier(s), and other composition effect attributes, the composition effect tutorial system can generate a metadata composite structure that represents any changes or modifications made to a digital content item, with individual nodes that accurately represent composition effects applied to a digital image. For example, in response to receiving user input to select a particular location within a composition interface (or a digital content item), the composition effect tutorial system identifies a corresponding node. For instance, the composition effect tutorial system identifies a node that has location information that matches (e.g., includes within its bounds) the coordinate location of the selection.

Accordingly, the composition effect tutorial system can determine, by its node, a composition effect that corresponds to the selected location. In some implementations, the composition effect tutorial system determines more than one composition effect for a given location (e.g., where a contrast effect and a warped text effect are both applied to the same area). In these or other implementations, the composition effect tutorial system provides a listing or other indicator of any composition effects for the selected area, whereby a user can select from among the composition effects.

In response to receiving a user selection of a particular composition effect, the composition effect tutorial system generates a tutorial for implementing the composition effect.

In some implementations, however, the composition effect tutorial system generates a composition effect tutorial without requiring user input to select an effect. To illustrate, the composition effect tutorial system can generate an animated walkthrough of specific user actions required to reproduce the desired composition effect. In some implementations, the composition effect tutorial system generates, during an ongoing composition session, indicators within a composition interface to guide the user through recreating the composition effect within a current composition interface in real time. In other implementations, the composition effect tutorial system generates an animated video walkthrough playable for the user to see the steps for implementing the composition effect.

In some implementations, the composition effect tutorial system further generates a suggested composition effect based on composition effects applied to similar digital content items. To illustrate, the composition effect tutorial system can generate and/or provide a recommendation to a user to implement a particular composition effect based on composition effects that the user (or other users) has applied to previous digital content items. In some implementations, the composition effect tutorial system can utilize a machine learning model such as a neural network trained to generate predicted composition effects based on training digital content items and corresponding ground truth composition effects.

In addition, the composition effect tutorial system can utilize context-aware information (e.g., the metadata composite structure) to generate templates. Indeed, the composition effect tutorial system can export one or more composition effect nodes as templates within a composition interface. Based on the templates, the composition effect tutorial system can enable users to create similar composition effects with a few simple interactions.

The composition effect tutorial system provides several advantages over conventional systems. For example, the composition effect tutorial system improves accuracy of generating and providing tutorials for implementing composition effects. To illustrate, the composition effect tutorial system generates and provides tutorials that are effect-specific and location-aware, thereby targeting precise composition effects which a user indicates. Thus, as opposed to conventional systems that require users to sift through composition videos to find how to use desired composition effects, the composition effect tutorial system enables a user to select exact locations of composition effects to access relevant tutorials in detail.

The composition effect tutorial system further improves efficiency over conventional systems. To illustrate, the composition effect tutorial system reduces the amount of time users of conventional systems are required to tediously search through how-to videos. Indeed, the composition effect tutorial system overcomes many setbacks inherent to the sequential nature of conventional systems that demonstrate how to create or edit digital content from start to finish, where any intermediate steps are only accessible by searching through the demonstration. For instance, the composition effect tutorial system enables users to select particular locations within a composition interface to access tutorials for specific composition effects at those locations, greatly reducing the amount of time spent compared to conventional systems.

The composition effect tutorial system also improves flexibility over conventional systems. For example, the composition effect tutorial system can flexibly generate tutorials for any selected composition effect, independent of other composition effects. In addition, as opposed to conventional systems that require users to extract and transfer the necessary information from a tutorial to apply composition effects to their own digital content, the composition effect tutorial system can present a tutorial within a composition interface to guide a user through implementing a composition effect within an ongoing composition session. Indeed, the composition effect tutorial system can adapt to present step-by-step instructions for a user's own digital content.

As a result of the improved accuracy, efficiency, and flexibility of the composition effect tutorial system, the composition effect tutorial system further provides better customer/user retention over conventional systems. In particular, the composition effect tutorial system is faster and easier to use to learn how to implement specific composition effects, which helps users feel more confident and comfortable. Indeed, the composition effect tutorial system better teaches users how to use editing tools that can otherwise be complex, and users are therefore more likely to continue using the tools in the future.

As illustrated by the foregoing discussion, the present disclosure utilizes a variety of terms to describe features and benefits of the composition effect tutorial system. Additional detail is hereafter provided regarding the meaning of these terms as used in this disclosure. For example, the term "digital content" refers to digital media with which a user can interact via a composition interface. A digital content item can include a digital image, digital design, a digital video, digital audio, or some other form of digital media.

As mentioned, the composition effect tutorial system can enable a user to create or modify digital content via a composition interface. As used herein, the term "composition interface" refers to a graphical user interface of a digital content editing application. For example, a composition interface can refer to a user interface whereby a user can view, create, edit, or otherwise manipulate digital content. A composition interface can include a digital content area for displaying digital content and can also include one or more toolbars, menus, or other interface elements selectable to utilize various tools and/or perform various functions in relation to digital content.

As also mentioned, the composition effect tutorial system can generate tutorials for implementing various composition effects. As used herein, the term "composition effect" refers to an effect that can be applied to a digital content item. In particular, a composition effect can refer to a visual or audio alteration made to digital content by way of a particular editing tool. For example, a composition effect can include an effect, modification, alteration, element, or function that can be applied to an item of digital content based on user input to apply a digital tool to the item of digital content. Examples of composition effects include, but are not necessarily limited to a contrast, a three-dimensional effect, a zoom, a move, a crop, a red eye correction, a text effect, a blemish removal, a border, a warp, a swell, or a twirl.

The composition effect tutorial system can generate a metadata composite structure based on various effects applied to a digital content item. As used herein, the term "metadata composite structure" refers to a digital structure that represents composition effects applied to digital content. In particular, a metadata composite structure can refer to a structure that utilizes digital composite technology ("DCX") in a scalable format to represent effects associated with a digital content item. For example, a metadata composite structure can include nodes that each represent a different composition effect associated with a digital content item. In addition, the metadata composite structure can reflect relationships between composition effects by utilizing a hierarchical structure of nodes, where some nodes are children of other nodes to represent, for example, a modification of a particular composition effect.

As mentioned, the composition effect tutorial system can generate nodes within a metadata composite structure. As used herein, the term "node" refers to a representation of a digital object or element within a metadata composite structure. For instance, a node can refer to a representation of a composition effect applied to a digital content item. A node can refer to a DCX element or a JavaScript Object Notation ("JSON") object within a metadata composite structure. A node can also refer to a parent node that has one or more other nodes constituent thereto or a child node that is constituent to a parent node. A child node can correspond to a composition effect applied to modify another composition effect such as a warp effect applied to a text added to a digital image. The composition effect tutorial system can generate a node to include various information such as location information, identifier information, and/or other composition attribute information.

As used herein, the term "location" or "location information" refers to a location or position within a composition interface or a digital content item. In particular, a location can refer to a coordinate location indicated by a number of pixels from an origin (e.g., the upper-left corner of a display, the composition interface, or a digital content item) in an x-axis direction and a y-axis direction. In addition, a location can include dimension information to indicate a size or area of a particular composition effect. For example, a location for a text effect can be represented by coordinates such as {x coordinate, y coordinate, x width, y height}, where the {x, y} coordinate indicates the upper-leftmost pixel of the composition effect, the x width indicates a number of pixels that the composition effect extends to the right from the leftmost pixel, and the y height indicates a number of pixels that the composition effect extends down from the uppermost pixel. In some implementations, the location information can have a different format such as in cases where the composition effect is applied in a non-rectangular area.

As mentioned, a node can include other information such as identifier information. As used herein, an "identifier" can refer to a label or other identifier associated with a composition effect. For example, an identifier can refer to a string of text that identifies or otherwise indicates a particular tool that is operable to generate a particular composition effect. For example, an identifier for a crop effect can be "crop," "crop tool," or "crop layer."

As also mentioned, a node can further include information pertaining to other composition effect attributes. As used herein, the term "composition effect attribute" or "effect attribute" refers to a particular attribute or trait of a composition effect. Indeed, beyond location information and an identifier, a node can include information that defines a composition effect. For instance, a composition effect attribute can include a value, color, intensity, opacity, font type, font size, hue, saturation, bend, rotation, or other some other information to define attributes associated with a composition effect.

As mentioned above, the composition effect tutorial system generates a tutorial for implementing a composition effect. As used herein, the term "tutorial" refers to a set of instructions for guiding a user to implement a composition effect. In particular, a tutorial can refer to a series of text instructions for performing various steps to apply a composition effect to a digital content item. A tutorial can also refer to an animation that indicates steps for implementing a composition effect in real time by, for example, highlighting or otherwise indicating various actions for a user to perform to implement a composition effect within a composition interface. A tutorial can also refer to a video playable for a user to see a demonstration of the various steps to implement a composition effect.

As mentioned, the composition effect tutorial system can utilize a neural network to generate suggested edits or composition effects. As used herein, the term "neural network" refers to an artificial machine-learning model that learns tasks by analyzing example data utilizing a plurality of layers that analyze features of the example data at different levels of abstraction. In particular, the term neural network can include a model of interconnected digital neurons that communicate and learn to approximate complex functions and generate outputs based on a plurality of inputs provided to the model. A neural network can include a variety of deep learning models, including convolutional neural networks, recurrent neural networks (e.g., with long short-term memory architecture), deep neural networks, or deep stacking networks. Neural networks such as recurrent neural networks can model complex non-linear relationships by generating hidden vector outputs along a sequence of inputs.

In some implementations, the composition effect tutorial system trains one or more neural networks to generate suggested or recommended composition effects. As used herein, the term "train" refers to utilizing information to tune or teach a neural network or other model. The term "training" (used as an adjective or descriptor, such as "training digital frames" or "training digital video") refers to information or data utilized to tune or teach the model.

Additional detail regarding the composition effect tutorial system will now be provided with reference to the figures. For example, FIG. 1 illustrates a schematic diagram of an example environment for implementing a composition effect tutorial system 102 in accordance with one or more implementations. An overview of the composition effect tutorial system 102 is described in relation to FIG. 1. Thereafter, a more detailed description of the components and processes of the composition effect tutorial system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 16.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 16. Although FIG. 1 illustrates a single client device 108, in some implementations the environment can include multiple different user client devices, each associated with a different user. The client device 108 can be capable of accessing and/or generating a metadata composite structure (e.g., with nodes representing composition effects). In some implementations, the client device 108 accesses or receives information from the server(s) 104 (e.g., via the network 112) indicating selected nodes within a metadata composite structure. Indeed, in response to receiving a user selection of a location within a composition interface (e.g., as part of the client application 110), the client device 108 can provide selection information to the server(s) 104, whereupon the server(s) 104 can provide node information to the client device 108 to indicate one or more selected composition elements. Additionally, or alternatively the client device 108 can be capable of generating a metadata composite structure locally and determining nodes and corresponding composition effects responsive to a user selection. Further, the client device 108 can facilitate operation of the client application 110.

Indeed, the client device 108 of FIG. 1 includes a client application 110. The client application 110 may be a web application or a native application installed on the client device 108 (e.g., a mobile application, a desktop application, etc.). The client application 110 can present a composition interface together with digital content and editing tools whereby a user can create, edit, or otherwise manipulate digital content. The client application 110 can also receive user input such as a selection of a location within the composition interface (or within the digital content). In some implementations, the client application 110 can interface with the composition effect tutorial system 102 to provide and/or receive digital content such as digital text, digital images, digital audio, and/or digital video from the server(s) 104, and to present (e.g., display) the digital content received from the server(s) 104.

As illustrated in FIG. 1, the environment includes the server(s) 104. The server(s) 104 may generate, store, receive, and transmit electronic data, such as digital text, digital video, digital images, digital audio, metadata, etc. For example, the server(s) 104 may receive data from the client device 108 in the form of a user selection location (e.g., a coordinate location). In addition, the server(s) 104 can transmit data to the client device 108 to provide a node and/or corresponding composition effect at the selected location. For example, the server(s) 104 can communicate with the client device 108 to transmit and/or receive data via the network 112. In some implementations, the server(s) 104 comprises a content server. The server(s) 104 can also comprise an application server, a communication server, a web-hosting server, a social networking server, or a digital content campaign server.

As shown in FIG. 1, the server(s) 104 can also include the composition effect tutorial system 102 as part of a digital content editing system 106. The digital content editing system 106 can communicate with the client device 108 to provide digital content such as digital text, digital audio, digital video, digital images, or some other type of information. Indeed, the digital content editing system 106 can refer to a digital image editing system and/or a system for facilitating manipulation of various digital content based on a metadata composite structure associated with the composition effect tutorial system 102.

Although FIG. 1 depicts the composition effect tutorial system 102 located on the server(s) 104, in some implementations, the composition effect tutorial system 102 may be implemented by (e.g., located entirely or in part) on one or more other components of the environment. For example, the composition effect tutorial system 102 may be implemented by the client device 108 and/or a third-party device.

In some implementations, though not illustrated in FIG. 1, the environment may have a different arrangement of components and/or may have a different number or set of components altogether. For example, the client device 108 may communicate directly with the composition effect tutorial system 102, bypassing the network 112. Additionally, the composition effect tutorial system 102 can include one or more databases (e.g., a digital content database) housed on the server(s) 104 or elsewhere in the environment. Further, the composition effect tutorial system 102 can include one or more machine learning models (e.g., neural networks). The composition effect tutorial system 102 can be implemented in a variety of different ways across the server(s) 104, the network 112, and the client device 108.

Figure 2:
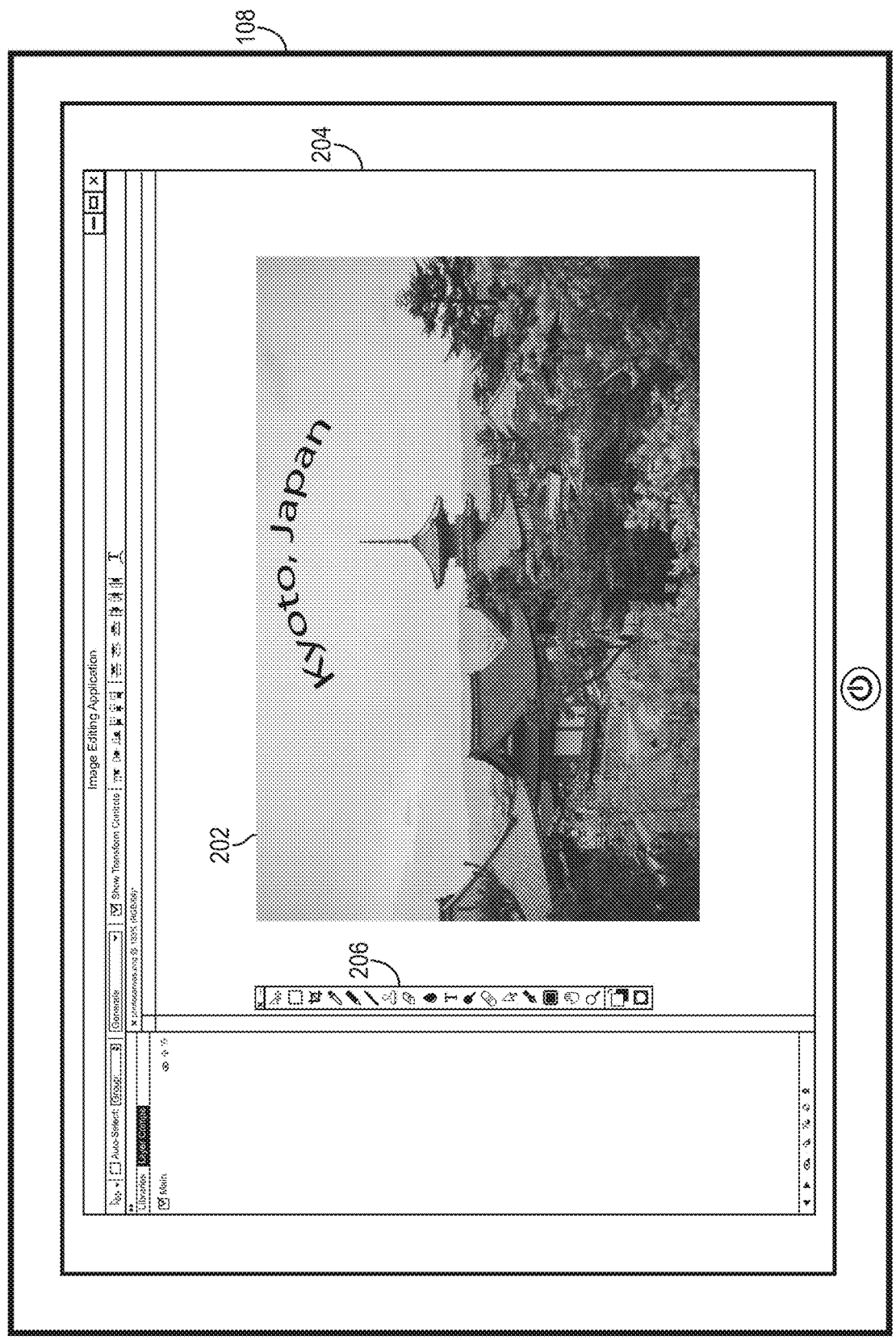
FIG. 2 illustrates an example composition interface in accordance with one or more implementations.

As mentioned above, the composition effect tutorial system 102 can facilitate editing of digital content. FIG. 2 illustrates an example client device 108 displaying a composition interface 204 that includes a digital content item 202 (e.g., a digital image) and a toolbar 206.

As illustrated in FIG. 2, the composition effect tutorial system 102 present a digital content item 202 within a composition interface 204. In particular, the composition effect tutorial system 102 displays a digital content item 202 that includes one or more composition effects. For instance, as shown in FIG. 2, the digital content item 202 includes a contrast effect (e.g., a black-and-white effect) and a warped text effect ("Kyoto, Japan"). Indeed, the composition effect tutorial system 102 can receive a user input in relation to the toolbar 206 or elsewhere to generate and apply one or more composition effects to the digital content item 202.

As further illustrated in FIG. 2, the composition effect tutorial system 102 determines locations of composition effects applied to the digital content item 202. In particular, the composition effect tutorial system 102 determines coordinate locations within the digital content item 202 where the contrast effect is applied. To illustrate, the composition effect tutorial system 102 can designate a particular corner of the digital content item 202 (e.g., the upper-left corner) as an origin and can measure a number of pixels in an x-axis (horizontal) direction and a y-axis (vertical) direction where the contrast effect is applied. In some implementations, the origin of $\{0, 0\}$ is the upper-left corner, and horizontal values increase to the right while vertical values increase in a downward direction. As shown, the composition effect tutorial system 102 determines that the contrast effect is applied to all pixels of the digital content item 202.

Alternatively, the composition effect tutorial system 102 determines coordinate locations relative to the composition interface or the display of the client device 108. To illustrate, the composition effect tutorial system 102 can designate a corner of the composition interface 204 as an origin and can measure a number of pixels in an x-axis (horizontal) direction and a y-axis (vertical) direction where the contrast effect (or other composition effect) is applied, relative to the origin of the composition interface 204. Similarly, for the display of the client device, the composition effect tutorial system 102 can designate a corner as an origin and determine coordinate locations where the contrast effect (or other composition effect) is applied.

As mentioned, the composition effect tutorial system 102 can determine coordinate locations where other composition effects are applied. For example, the composition effect tutorial system 102 determines a coordinate location where the warped text effect is applied to the digital content item 202. Indeed, the composition effect tutorial system 102 can determine a distance (e.g., in pixels) from an origin in both a horizontal direction and a vertical direction where the composition effect begins. For example, the composition effect tutorial system 102 identifies an upper-left corner of the composition effect and can determine a location of the identified upper-left corner.

In addition to determining a start location of a composition effect, the composition effect tutorial system 102 can further determine dimensions of the composition effect. For example, the composition effect tutorial system 102 determines the extent or area of the digital content item 202 to which the particular composition effect applies. As shown in FIG. 2, for example, the composition effect tutorial system 102 determines that the contrast effect is applied to the whole digital content item 202, while the warped text effect is applied only to a portion of the digital content item 202. Thus, the composition effect tutorial system 102 can determine a location of an upper-left corner (relative to the origin) of the warped text effect as well as a height and width, to represent the location of the effect by {x, y, width, height} to define the area of the warped text effect.

In some implementations, the composition effect tutorial system 102 can generate composition effects having shapes other than rectangles. In these implementations, the composition effect tutorial system 102 defines the location of the composition effect based on some other reference point (e.g., a center point) of the composition effect. The composition effect tutorial system 102 then represents the area covered by the composition effect by a number of pixels in each direction of the reference point. For example, the composition effect tutorial system 102 defines a circular composition effect using a center point and a radius of the circle (e.g., a number of pixels from the center point to the edge of the effect).

In addition to utilizing a Cartesian coordinate system, the composition effect tutorial system 102 can also, or alternatively, utilize a different type of coordinate system to determine locations of composition effects. For example, the composition effect tutorial system 102 can utilize a polar coordinate system, a spherical coordinate system (e.g., for three-dimensional digital content), or some other type of coordinate system.

As mentioned, in addition to determining locations of composition effects, the composition effect tutorial system 102 can also determine identifiers associated with the composition effects. To illustrate, the composition effect tutorial system 102 determines which tool (e.g., from the toolbar 206 or elsewhere) that a user selected for generating a given composition effect. For example, the composition effect tutorial system 102 labels each composition effect of the digital content item 202 with a string of text that represents the editing tool used for creating the effect. For the contrast effect, the composition effect tutorial system 102 generates an identifier of "contrast," and, for the warped text effect, the composition effect tutorial system 102 generates a "text box" identifier and a "warp effect" identifier. Indeed, in some implementations, a composition effect can be composed of multiple constituent composition effects. As an example, a warped text effect can be composed of a text box effect in conjunction with a warp effect to warp the text of the text box.

As also mentioned, the composition effect tutorial system 102 can generate and/or determine other information pertaining to composition effects. Indeed, in addition to location information and identifier information, the composition effect tutorial system 102 determines other composition effect attributes associated with composition effects. To illustrate, the composition effect tutorial system 102 determines various settings or parameters associated with a given composition effect. For a text effect, for example, the composition effect tutorial system 102 determines a font type, a font size, and a font color. For a contrast effect, the composition effect tutorial system 102 determines a contrast level or value. For these or other types of composition effects, the composition effect tutorial system 102 can determine various composition effect attributes such as hue, saturation, opacity, bend, rotation, and blur, among others.

Based on the location information, the identifier information, and the composition effect attributes associated with composition effects, the composition effect tutorial system 102 can generate a metadata composite structure to represent the composition effects. For example, as mentioned above, the composition effect tutorial system 102 generates a metadata composite structure for a given digital content item 202. The metadata composite structure can comprise a number of nodes, each node corresponding to a respective composition effect within the digital content item 202. Thus, based on the metadata composite structure, the composition effect tutorial system 102 maintains information pertaining to all composition effects associated with the digital content item 202 independent of the digital content item 202 itself.

In some implementations, the composition effect tutorial system 102 may not necessarily generate the metadata composite structure, but the metadata composite structure may be pre-generated. In these implementations, the composition effect tutorial system 102 can access the metadata composite structure to obtain various information stored within nodes of the metadata composite structure, such as location information or identifier information. Additional detail regarding the architecture of the metadata composite structure is provided below with reference to FIG. 10.

Although FIG. 2 illustrates a digital content item 202 in the form of a digital image, in some implementations the composition effect tutorial system 102 provides a composition interface 204 for manipulating other forms of digital content such as digital video, digital audio, digital text, or three-dimensional digital objects. Accordingly, the composition effect tutorial system 102 can generate a separate metadata composite structure for each digital content item.

Figure 3:
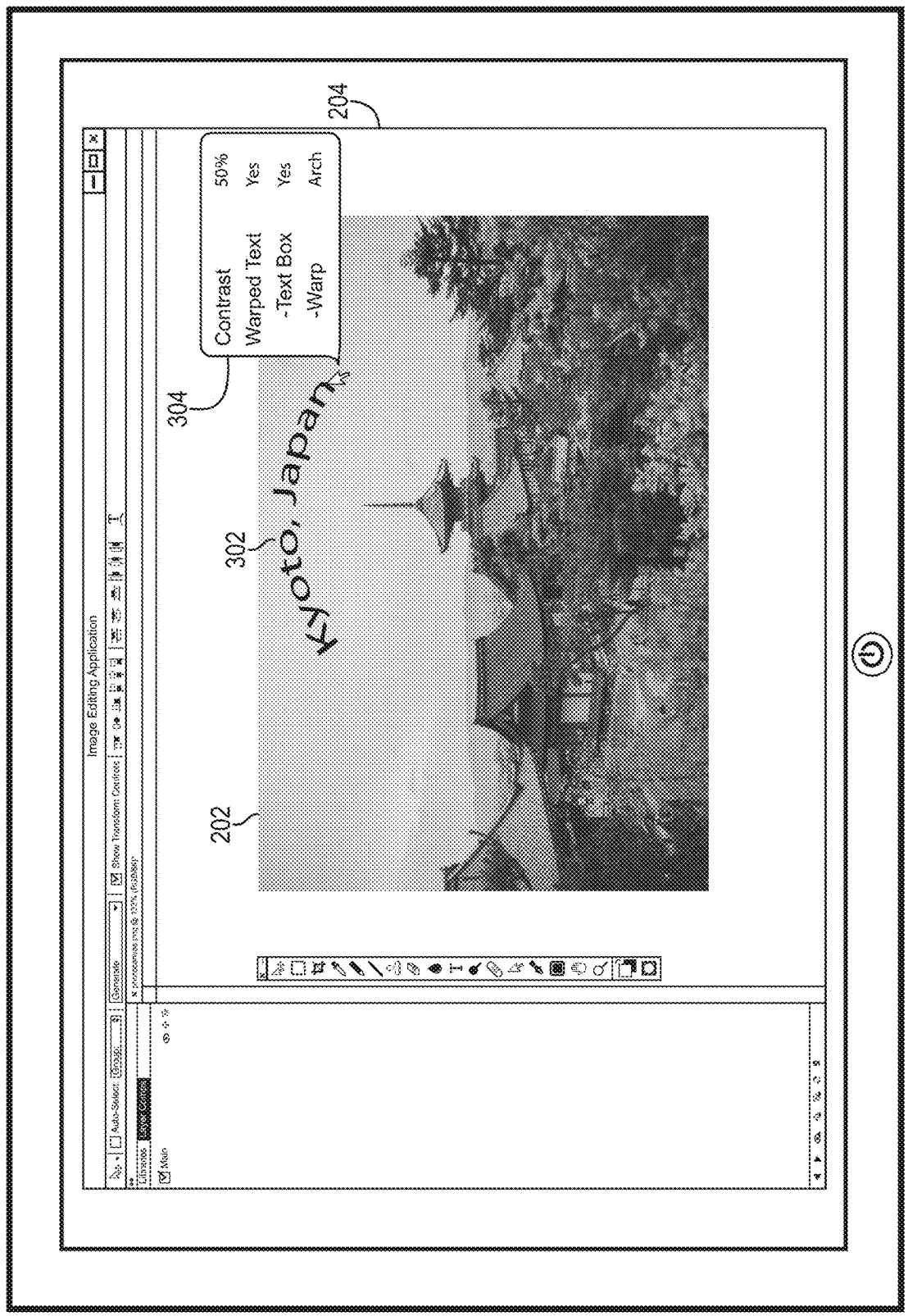
FIG. 3 illustrates an example listing of composition effects at a selected location in accordance with one or more implementations.

As mentioned, the composition effect tutorial system 102 can receive a selection (e.g., a click, a tap, etc.) from a user of a location within the composition interface 204 (e.g., within the digital content item 202). FIG. 3 illustrates a user selection of a particular location, as indicated by the cursor within the composition interface 204. In particular, the composition effect tutorial system 102 determines a coordinate location of the selection. In addition, the composition effect tutorial system 102 identifies any composition effects applied at the selected location. For example, the composition effect tutorial system 102 may receive a selection at a particular pixel location whereupon the composition effect tutorial system 102 can analyze a metadata composite structure to identify any nodes therein that match the selected pixel location.

To identify a node that matches the pixel location, the composition effect tutorial system 102 determines, for each node within the metadata composite structure, whether the selected pixel location within the composition interface 204 (or digital content item 202) falls within the bounds of its location information. Accordingly, the composition effect tutorial system 102 determines a composition effect applied at the selected location by determining an identifier within any node that matches the selected location.

As illustrated in FIG. 3, for example, the composition effect tutorial system 102 receives a user selection at the location indicated by the cursor within the digital content item 202. Based on this location, the composition effect tutorial system 102 identifies multiple composition effects— the contrast effect applied to the whole digital content item 202 and the warped text effect 302 of "Kyoto, Japan" (which consists of a text effect and a constituent warp effect). As shown, the composition effect tutorial system 102 provides a summary or listing 304 of the composition effects at the selected location.

In addition to presenting the composition effects, the composition effect tutorial system 102 can also present a summary of important parameters associated with the composition effects. For example, the listing 304 of FIG. 3 illustrates that the contrast effect is set at 50% for the digital image, while a warped text is applied with a text box and an arch warp applied to the text within the text box. In some implementations, the composition effect tutorial system 102 does not present the parameters associated with the composition effects, but instead only presents the composition effects within the listing 304. In these or other implementations, the composition effect tutorial system 102 generates a presentation of composition effects applied at a particular selected location using a pop-up window, a dialog box, or another type of indicator.

As mentioned, the composition effect tutorial system 102 can enable a user to select a composition effect from the listing 304. Accordingly, the composition effect tutorial system 102 receives a selection of a composition effect form the listing 304. For example, the composition effect tutorial system 102 can receive a user input to select the contrast effect or the warped text effect. In some implementations, the composition effect tutorial system 102 can enable a user selection of subcomponent or constituent effects such as the text box effect (as a component of the warped text), and/or the warp effect (also a component of the warped text). In some implementations, the composition effect tutorial system 102 receives a user selection of more than one composition effect. In these implementations, the composition effect tutorial system 102 generates a tutorial for each selected composition effect in accordance with this disclosure by either generating a single tutorial for all selected composition effects or by generating individual tutorials for each selected composition effect.

In some implementations, the composition effect tutorial system 102 may not present a listing of composition effects at all. Indeed, some locations of a digital content item (e.g., the digital content item 202) have only a single composition effect applied. Thus, for these locations, the composition effect tutorial system 102 may generate a tutorial for implementing the composition effect without first presenting a listing of composition effects and requiring a user to select the effect before generating the tutorial.

Figure 4:
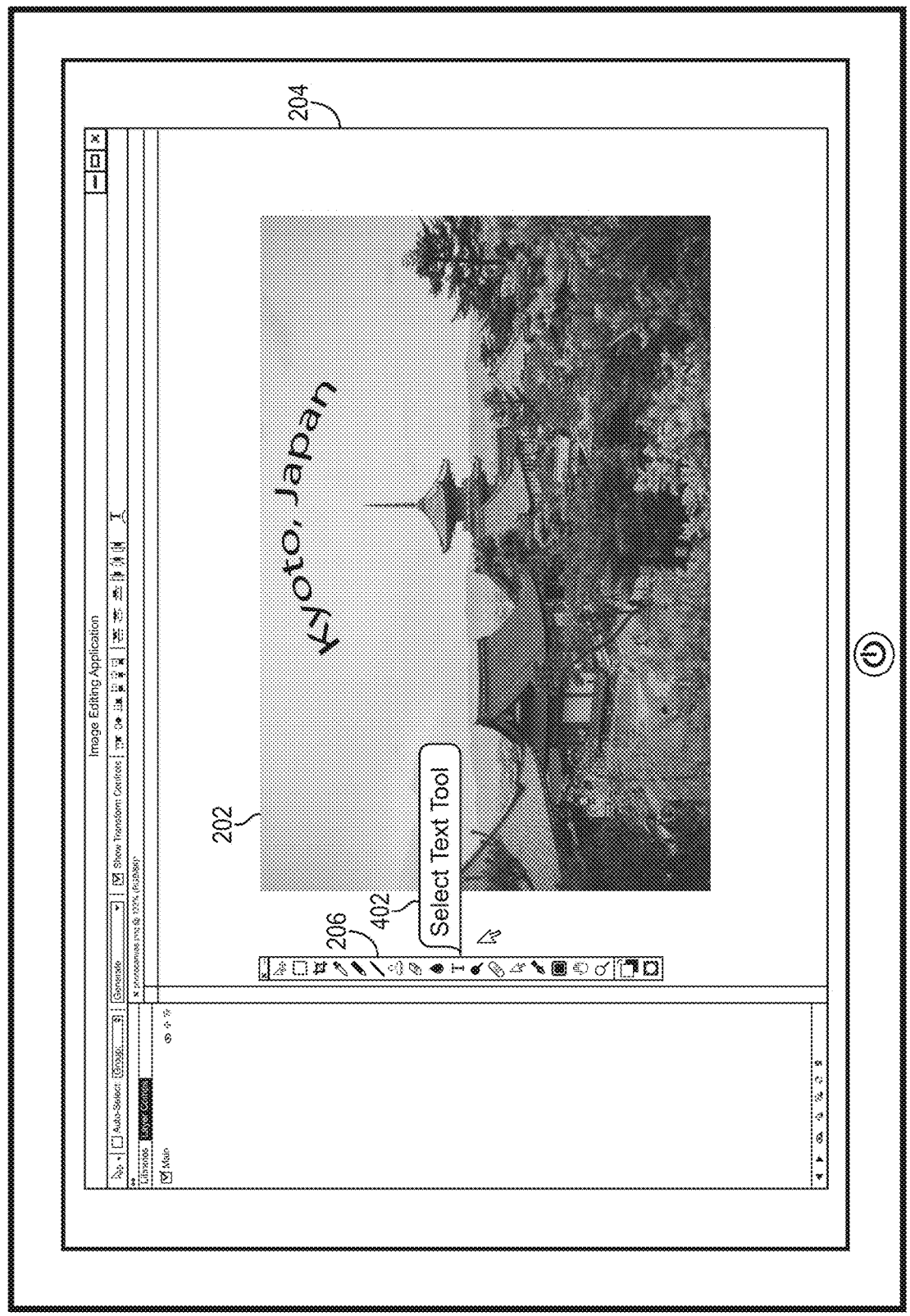
FIGS. 4-9 illustrate an example workflow for implementing steps to create a composition effect in accordance with one or more implementations.

As mentioned, the composition effect tutorial system 102 generates a tutorial for implementing a composition effect. FIG. 4 illustrates a first step of a tutorial for implementing the warped text effect shown in the listing 304 of FIG. 3. Indeed, the composition effect tutorial system 102 receives a selection of the warped text effect from the listing 304 and proceeds to generate and present a tutorial for implementing the warped text effect, starting with the step shown in FIG. 4 and continuing to the step shown in FIG. 9.

As illustrated in FIG. 4, the composition effect tutorial system 102 generates and presents an instruction 402. In particular, the composition effect tutorial system 102 generates the instruction 402 to guide the user to "Select Text Tool." As shown, the composition effect tutorial system 102 generates the instruction 402 for presentation within the composition interface 204. For example, the composition effect tutorial system 102 presents the instruction 402 at a particular location within the composition interface 204. For instance, the composition effect tutorial system 102 accesses an API or function to generate the instruction 402 at a particular location within the composition interface 204.

In some implementations, the composition effect tutorial system 102 can place the instruction 402 at a location relative to (e.g., nearby, adjacent to) the corresponding tool. Indeed, the composition effect tutorial system 102 presents the instruction 402 in an easy-to-see manner in real time as the user is currently working in the composition interface 204. Thus, the composition effect tutorial system 102 guides the user through the first step in implementing the composition effect with respect to the digital content item 202.

In some implementations, the composition effect tutorial system 102 may generate a tutorial having a different format or appearance than the dialog box illustrated in FIG. 4. For example, the composition effect tutorial system 102 may instead highlight, outline, or otherwise emphasize various tools within the composition interface 204 with respect to each step of the tutorial. In some implementations, the composition effect tutorial system 102 also (or alternatively) generates a listing of instructions (e.g., the steps of FIGS. 4-9, respectively) for presentation within the composition interface 204 (or elsewhere). In some implementations, the composition effect tutorial system 102 generates a digital video playable to demonstrate implementing the selected composition effect.

Figure 5:
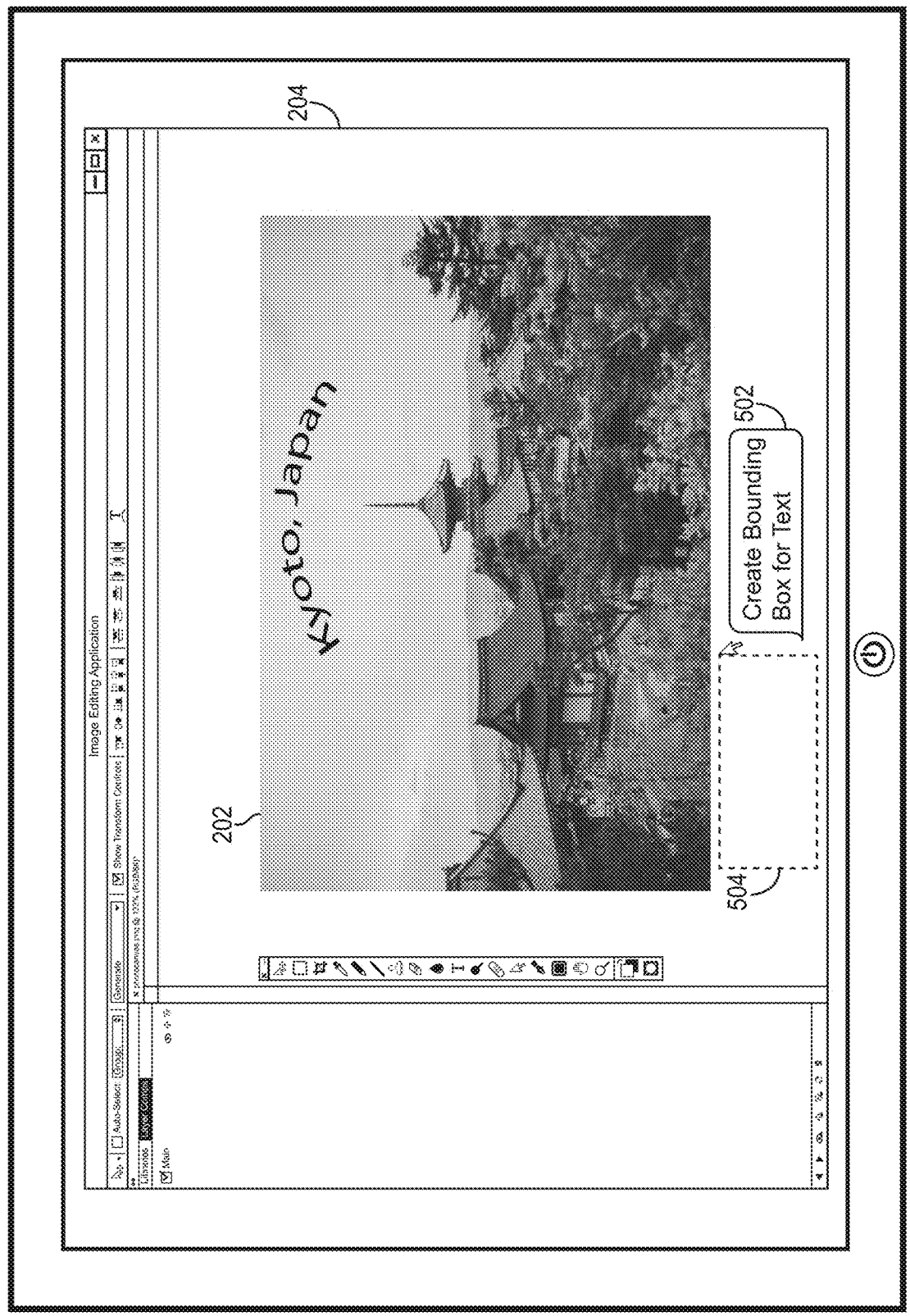

Upon receiving a user selection of the first instruction 402, the composition effect tutorial system 102 generates and presents a second instruction 502. As shown, in response to receiving a selection of the Text Tool (as indicated by the instruction 402), the composition effect tutorial system 102 proceeds to present the next step in the instructions for implementing the composition effect (i.e., the warped text effect). FIG. 5 illustrates an instruction 502 in relation to the second step in implementing the warped text effect. As shown, the composition effect tutorial system 102 generates and presents the instruction 502 to "Create Bounding Box for Text" once the user has selected the Text Tool.

As illustrated in FIG. 5, the composition effect tutorial system 102 guides the user to create a bounding box to define an area for inserting text. In addition, the composition effect tutorial system 102 receives user input to create the bounding box 504 within the composition interface 204. As shown, the composition effect tutorial system 102 receives the user input to generate the bounding box 504 as an area for inserting text as part of implementing the composition effect.

Figure 6:
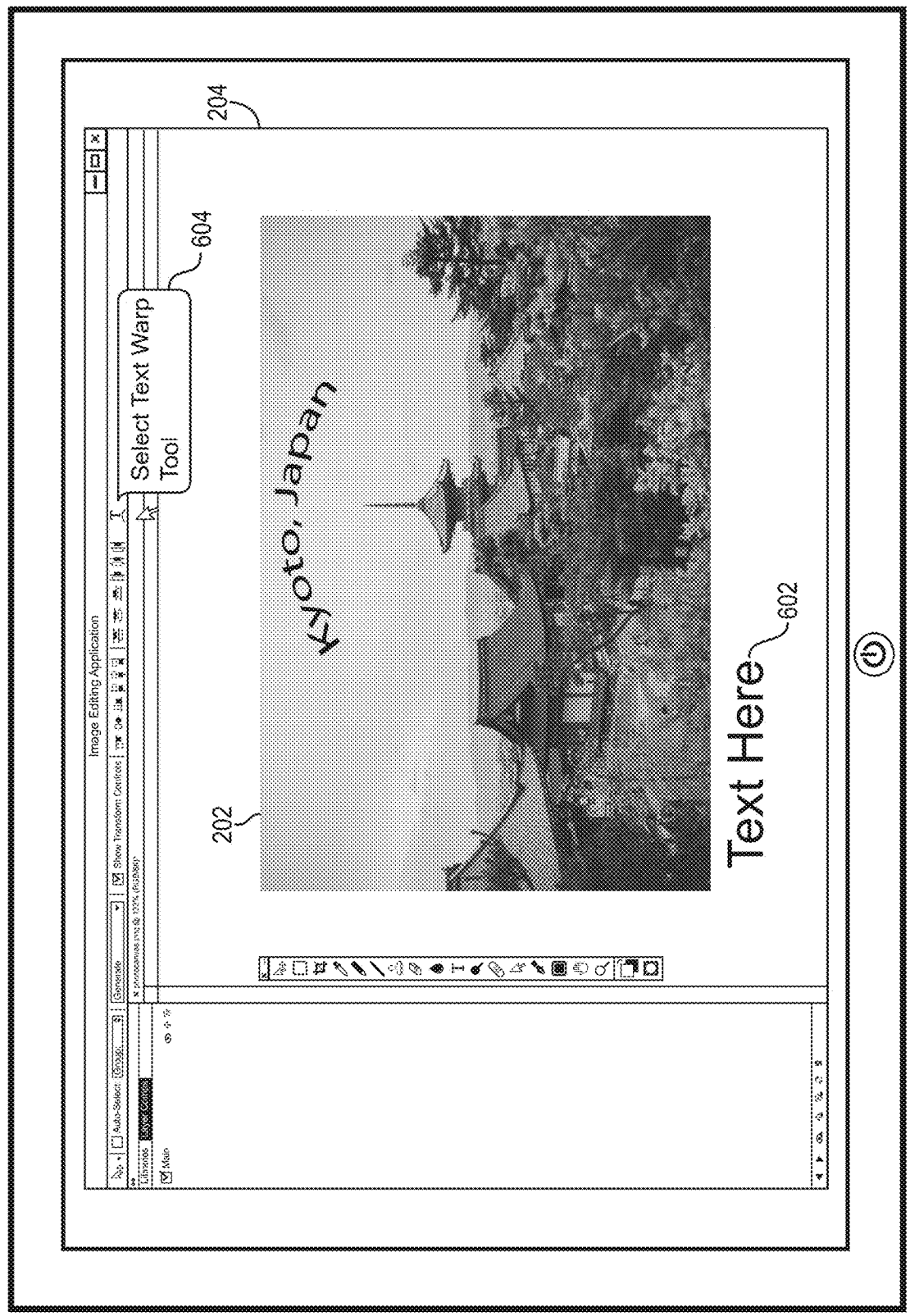

In response to receiving user input to perform the second step in implementing the composition effect, the composition effect tutorial system 102 proceeds further to present a subsequent step. Indeed, based on receiving the user input to create the bounding box 504, the composition effect tutorial system 102 continues to present the next step in the tutorial. FIG. 6 illustrates an instruction 604 to "Select Text Warp Tool." As illustrated, the composition effect tutorial system 102 guides the user to select a Text Warp tool as the next step in implementing warped text in relation to text entered within the bounding box 504. As further shown in FIG. 6, the composition effect tutorial system 102 has not received text to enter within the text box 504 and therefore inserts the default "Text Here" text 602.

The composition effect tutorial system 102 continues to present steps of the tutorial until the composition effect is successfully implemented. In particular, the composition effect tutorial system 102 can generate and present dialog boxes for the user to select or otherwise input various parameters. The composition effect tutorial system 102 can receive user input to define composition effect attributes associated with a composition effect.

Figure 7:
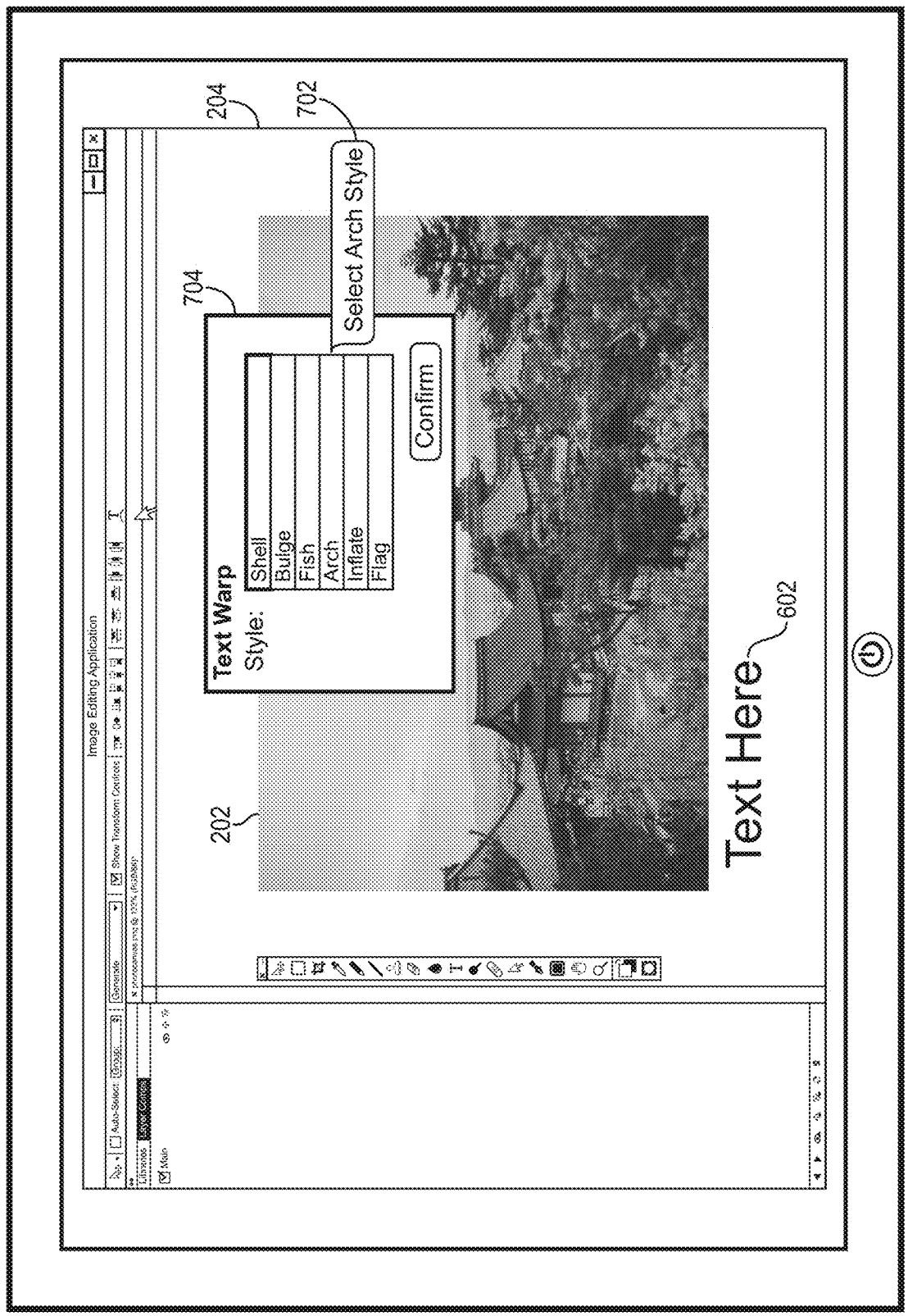
Figure 8:
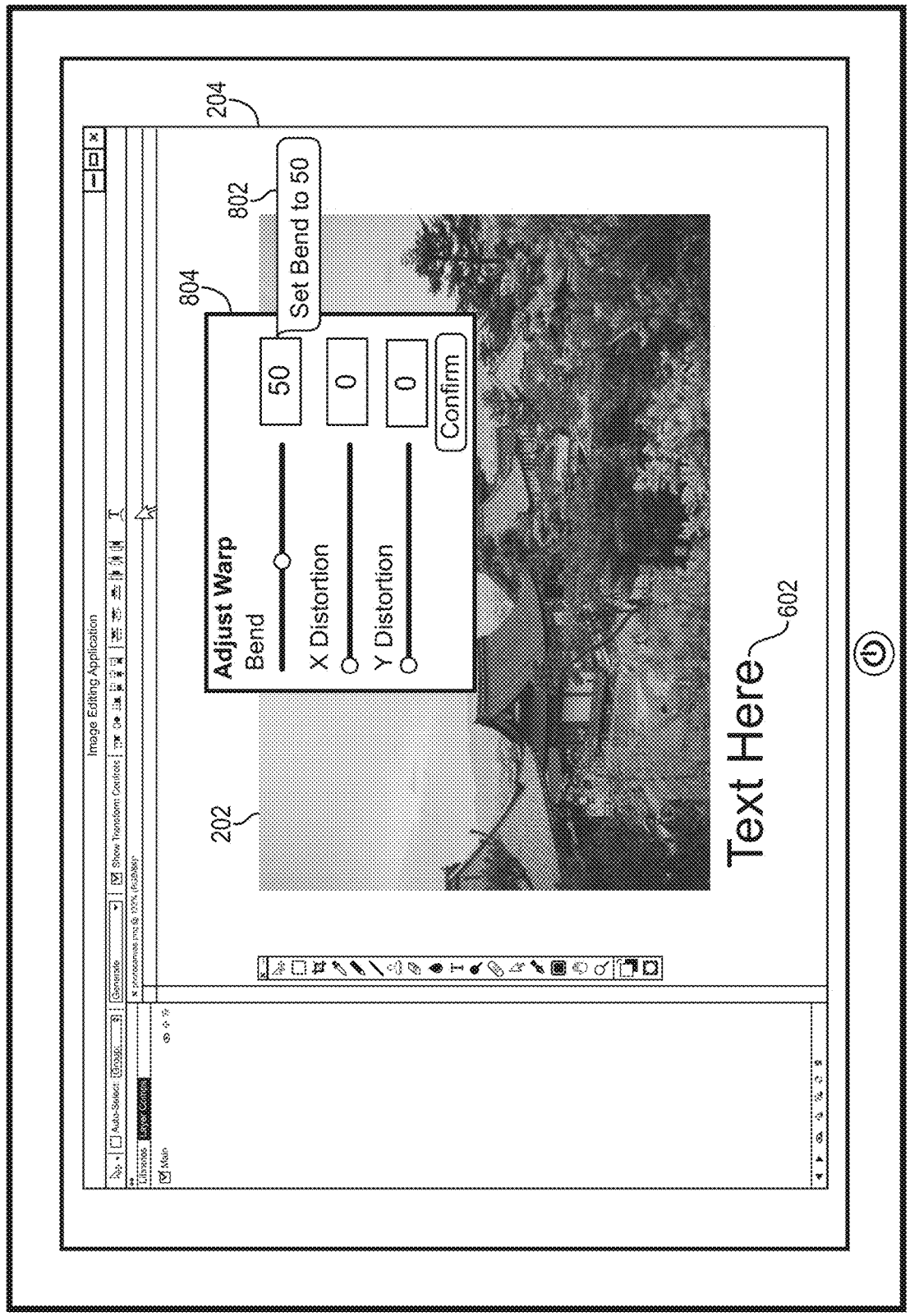

FIG. 7 illustrates an instruction 702 responsive to a selection of the Text Warp tool of FIG. 6. As illustrated in FIG. 7, the composition effect tutorial system 102 generates and presents the instruction 702 in relation to the dialog box

704. In particular, based on the selection of the Text Warp tool, the composition effect tutorial system 102 provides the dialog box 704 whereby the user can select a style or type of text warp.

As illustrated, the composition effect tutorial system 102 further provides the instruction 702 to guide the user to select a style of text warp from the dialog box 704. As further illustrate by the instruction 702, the composition effect tutorial system 102 guides the user to specifically select the "Arch" style of text warp. In some implementations, however, the composition effect tutorial system 102 may generate a tutorial that is less specific in its instructions or that leaves some choices up to the user. Indeed, the composition effect tutorial system 102 generates a tutorial that provides instructions to select from a number of options (e.g., the styles of text warp in the dialog box 704). Thus, in some implementations the composition effect tutorial system 102 generates and presents a tutorial that provides a general framework for implementing a composition effect. Additionally, although FIG. 7 illustrates a "Confirm" button within the dialog box 704, in some implementations the composition effect tutorial system 102 does not provide a "Confirm" button but instead receives the selection of the text warp style and proceeds immediately to the next step of the tutorial.

Based on receiving a selection of the Arch style of text warp, the composition effect tutorial system 102 provides the next step of the tutorial for implementing the composition effect. As shown, the composition effect tutorial system 102 presents an instruction 802 to "Set Bend to 50." Indeed, the composition effect tutorial system 102 generates and presents a dialog box 804 that includes various parameters associated with composition effect attributes such as "Bend," "X Distortion," and "Y Distortion." Based on the selected warped text composition effect, the composition effect tutorial system 102 provides the instruction 802 to set the bend to 50 to match the bend of the selected warped text ("Kyoto, Japan") within the digital content item 202.

As mentioned, in some implementations the composition effect tutorial system 102 provides more general instructions for the tutorial. In these or other implementations, instead of instructing the user to "Set Bend to 50," the composition effect tutorial system 102 generates an instruction to "Set Desired Bend." Similarly, the composition effect tutorial system 102 can enable the user to set other parameters for composition effect attributes, such as the X distortion, Y distortion or others.

Figure 9:
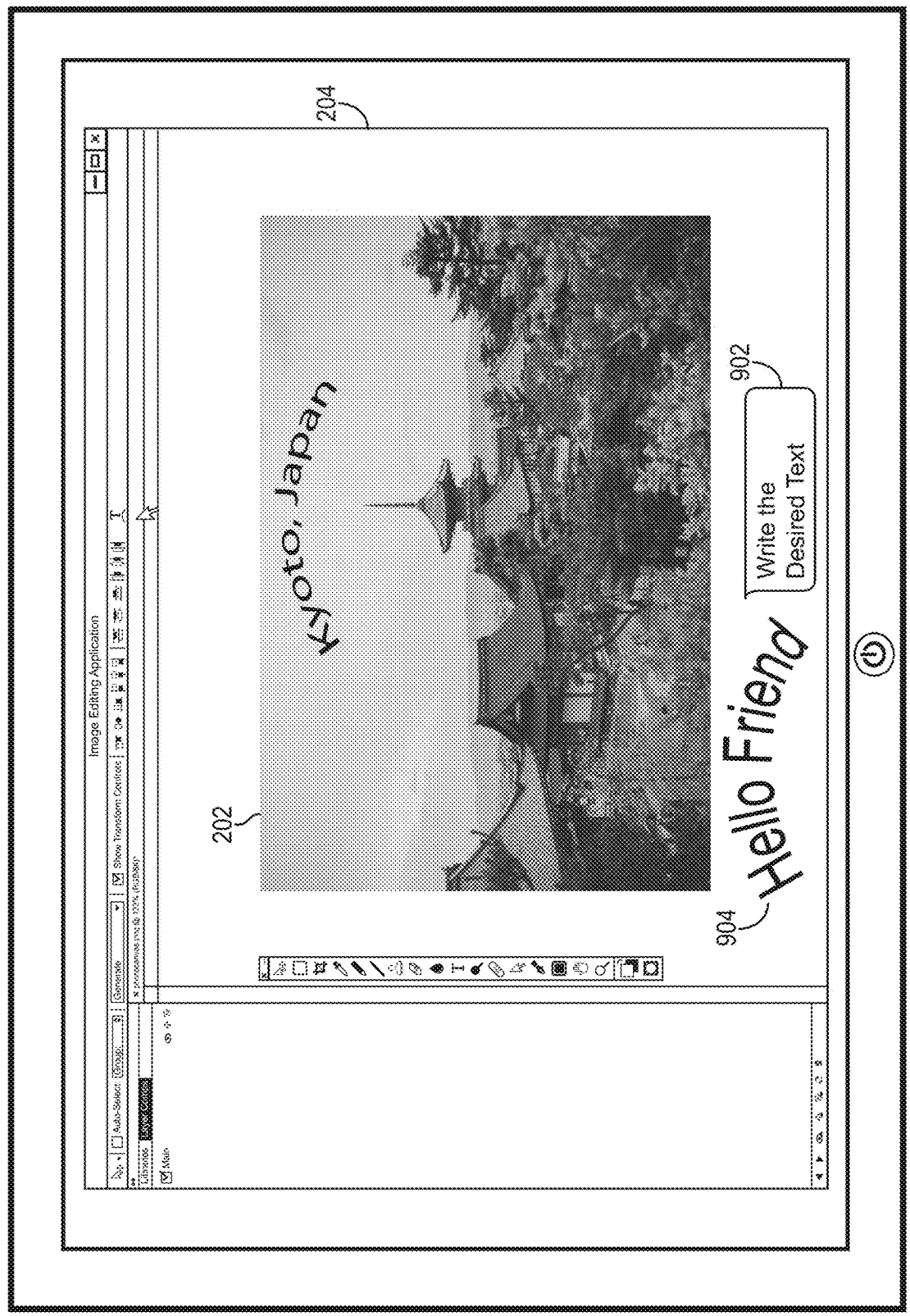

Upon receiving user input to set the bend to 50, the composition effect tutorial system 102 proceeds to the next step of the tutorial. FIG. 9 illustrates the next and final step of the tutorial for implementing the warped text effect. As shown, the composition effect tutorial system 102 generates and provides an instruction 902 to "Write the Desired Text" within the text box (e.g., the text box 504). Based on receiving user input to write the desired text, the composition effect tutorial system applies the above-mentioned composition effect attributes to the composition effect—i.e., the warp style and bend settings.

As illustrated in FIG. 9, the composition effect tutorial system 102 receives text 904 of "Hello Friend." The composition effect tutorial system 102 warps the text with an Arch style having a bend of 50 as shown in FIG. 9. Indeed, the composition effect of the text 904 ("Hello Friend") is the same as the composition effect of the text "Kyoto, Japan," as the user selected to initiate the tutorial. In some implementations, the composition effect tutorial system 102 ends the tutorial upon completion of implementing the composition effect. In these or other implementations, the composition effect tutorial system 102 indicates the end of the tutorial by, for example, presenting a completion message such as "End of Tutorial" or "Completed."

Although the discussion of FIGS. 4-9 relates primarily to generating and presenting steps of a tutorial for implementing a composition effect, in some implementations the composition effect tutorial system 102 may not generate the tutorial. Indeed, the composition effect tutorial system 102 may instead receive the tutorial from an external source (e.g., the server(s) 104). In these or other implementations, the composition effect tutorial system 102 presents or displays the tutorial as described above in real-time and/or in one of the other above-mentioned formats.

Additionally, although not illustrated in FIGS. 4-9, the composition effect tutorial system 102 can generate a "Next" button in relation to each illustrated step for implementing a composition effect and that is selectable to proceed to a subsequent step in the tutorial. Further, in some implementations the composition effect tutorial system 102 enables users to create composition effects that are similar to a composition effect of a generated tutorial. Indeed, the composition effect tutorial system 102 can generate a tutorial that provides certain freedoms to users to set different composition effect attributes throughout the process of implementing the composition effect. In these implementations, the composition effect tutorial system 102 provides a broader framework of the main step in creating the composition effect while leaving some of the details of each step up to the user.

Figure 10:
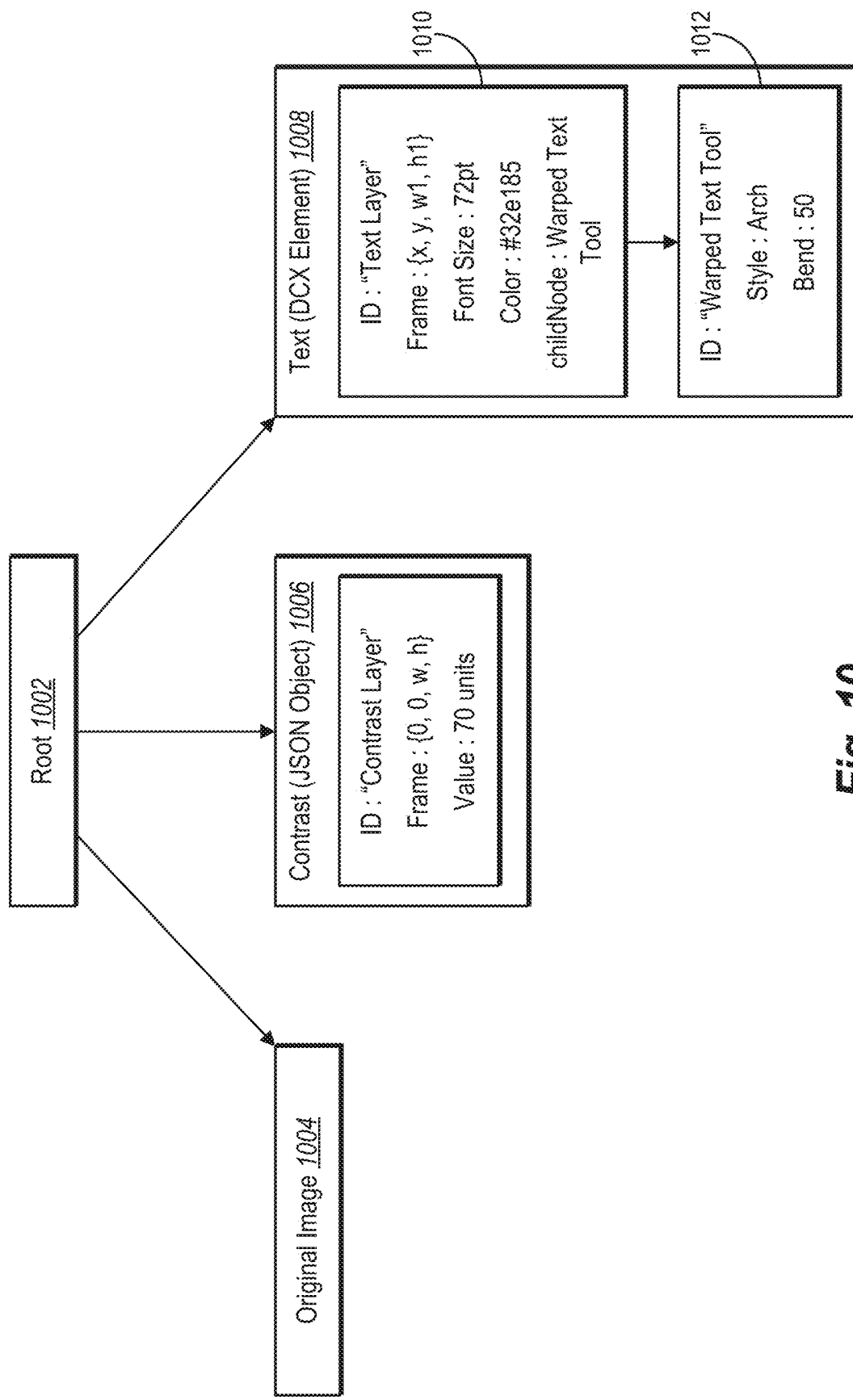
FIG. 10 illustrates an example architecture of a metadata composite structure in accordance with one or more implementations.

As mentioned, to generate the tutorial illustrated in FIGS. 4-9, the composition effect tutorial system 102 generates and/or accesses a metadata composite structure. FIG. 10 illustrates an example metadata composite structure including various nodes corresponding to composition effects within the digital content item 202. As illustrated, the composition effect tutorial system 102 utilizes a DCX composite structure to capture vital information such as areas on which composition effects are applied, corresponding identifiers, and other composition effect information.

As shown, the composition effect tutorial system 102 generates a root node 1002 which utilizes the digital content item 202 as a resource. Indeed, the root node 1002 refers to three nodes, the original image node 1004 of the digital content item 202, a contrast node 1006 corresponding to the contrast effect, and a text node 1008 corresponding to the warped text effect. The composition effect tutorial system 102 generates the contrast node 1006 having a particular format. In some implementations, the composition effect tutorial system 102 utilizes JavaScript Object Notation ("JSON") to generate various nodes, including the contrast node 1006. In the same or other implementations, the composition effect tutorial system 102 generates nodes or DCX elements of other formats. Indeed, the composition effect tutorial system 102 utilize a modified DCX format to generate nodes for each composition effect applied to a given digital content item.

The composition effect tutorial system 102 generates the contrast node 1006 to include various information. As illustrated, the composition effect tutorial system 102 includes an identifier associated with the contrast node 1006. Indeed, the composition effect tutorial system 102 identifies the contrast node 1006 with an identifier of "Contrast Layer." As mentioned above, the composition effect tutorial system 102 can utilize an identifier that corresponds with a particular editing tool.

As illustrated in FIG. 10, the composition effect tutorial system 102 generates the contrast node 1006 to include location information. Indeed, the composition effect tutorial system 102 includes "Frame" information to indicate where in the frame of the digital content item 202 (or the composition interface 204) the contrast is applied. As shown, the composition effect tutorial system 102 can include a particular format for the location information given by:

{x, y, w, h} where x indicates a horizontal location of the left-most edge of the contrast effect, y indicates a vertical location of the top-most edge of the contrast effect, w indicates a width (horizontal extent) of the contrast effect, and h indicates a height (vertical extent) of the contrast effect. In some implementations, as discussed above, the composition effect tutorial system 102 determines that the contrast effect is applied to the whole digital content item 202. In these implementations, the composition effect tutorial system 102 generates the contrast node 1006 to include w and h terms that match the width and height of the digital content item 202.

As further illustrated, the composition effect tutorial system 102 includes a "Value" term as part of the contrast node 1006. In particular, the composition effect tutorial system 102 generates the contrast node 1006 to include composition effect attributes associated with a contrast effect. Thus, the composition effect tutorial system 102 includes a value term to define an intensity of the contrast ("70 units") applied to the digital content item 202.

FIG. 10 further illustrates the text node 1008 that corresponds to the warped text effect of the generated tutorial. As shown, the composition effect tutorial system 102 generates a text node 1008 that includes a text layer node 1010 that is a parent node of a warped text tool node 1012 (which is therefore a child node). In some implementations, however, the composition effect tutorial system 102 generates the text layer node 1010 and the warped text tool node 1012 without the encompassing text node 1008.

As shown, the composition effect tutorial system 102 generates the text layer node 1010 to include various information such as an identifier, location, font size, color, and child node information. For instance, the composition effect tutorial system 102 includes an identifier of "Text Layer" corresponding to a text tool used to generate the composition effect of adding text. In addition, the composition effect tutorial system 102 includes a "Frame" to indicate the location of the text box within the digital content item 202 and/or composition interface 204. Furthermore, the composition effect tutorial system 102 includes other composition attribute information such as font size, font color, and a child node identifier to define the composition effect.

By including a child node identifier, the composition effect tutorial system 102 generates a hierarchy between various nodes of the metadata composite structure. Indeed, the composition effect tutorial system 102 can assign one node as a child node of another by designating it with a child node identifier within the parent node. Thus, the composition effect tutorial system 102 generates the warped text tool node 1012 as a child node of the text layer node 1010.

As illustrated, the composition effect tutorial system 102 generates the warped text tool node 1012 to include composition effect attributes such as "Style" and "Bend" to indicate the style of warp selected by the user and the bend set by the user. By virtue of generating the warped text tool node 1012 as a child node of the text layer node 1010, the composition effect tutorial system 102 further defines the text layer by the composition effect attributes of the child node (i.e., the warped text tool node 1012). Though it may not always be the case, as a child node, the warped text tool node 1012 inherits some of the features of its parent node such as its location information or "Frame." In some implementations, the composition effect tutorial system 102 includes more composition effect attributes within a node than those shown in FIG. 10. Indeed, the composition effect tutorial system 102 can define each composition effect attribute of a composition effect. For example, in some implementations the composition effect tutorial system 102 includes an "X Distortion" parameter and a "Y Distortion" parameter for the X distortion and Y distortion options described above.

As mentioned above, to determine which composition effects are applied at a particular selected location, the composition effect tutorial system 102 accesses the metadata composite structure. To illustrate, the composition effect tutorial system 102 can implement a particular algorithm to access information within the metadata composite structure by calling specific functions or application programming interfaces ("APIs") to obtain information. For instance, the composition effect tutorial system 102 calls functions on a node-by-node basis to retrieve contrast node information and text node information. The composition effect tutorial system 102 can further utilize an API to generate a playback or tutorial for a selected composition effect. Indeed, each node within the metadata composite structure can have a corresponding instruction or "Tooltip" that the composition effect tutorial system 102 can access for generating a tutorial.

To identify composition effects at a selected location, the composition effect tutorial system 102 compares the selected location with location information of the various nodes within the metadata composite structure. To illustrate from FIG. 10, the composition effect tutorial system 102 compares an x-y pixel coordinate of the selection with the location information of the contrast node 1006 and the text layer node 1010 to determine whether the coordinate location of the selection falls within the bounds of the location information of each respective node. If the selected location does fall within the bounds of a node, then the composition effect tutorial system 102 determines that the corresponding composition effect is applied at the selected location.

Figure 11:
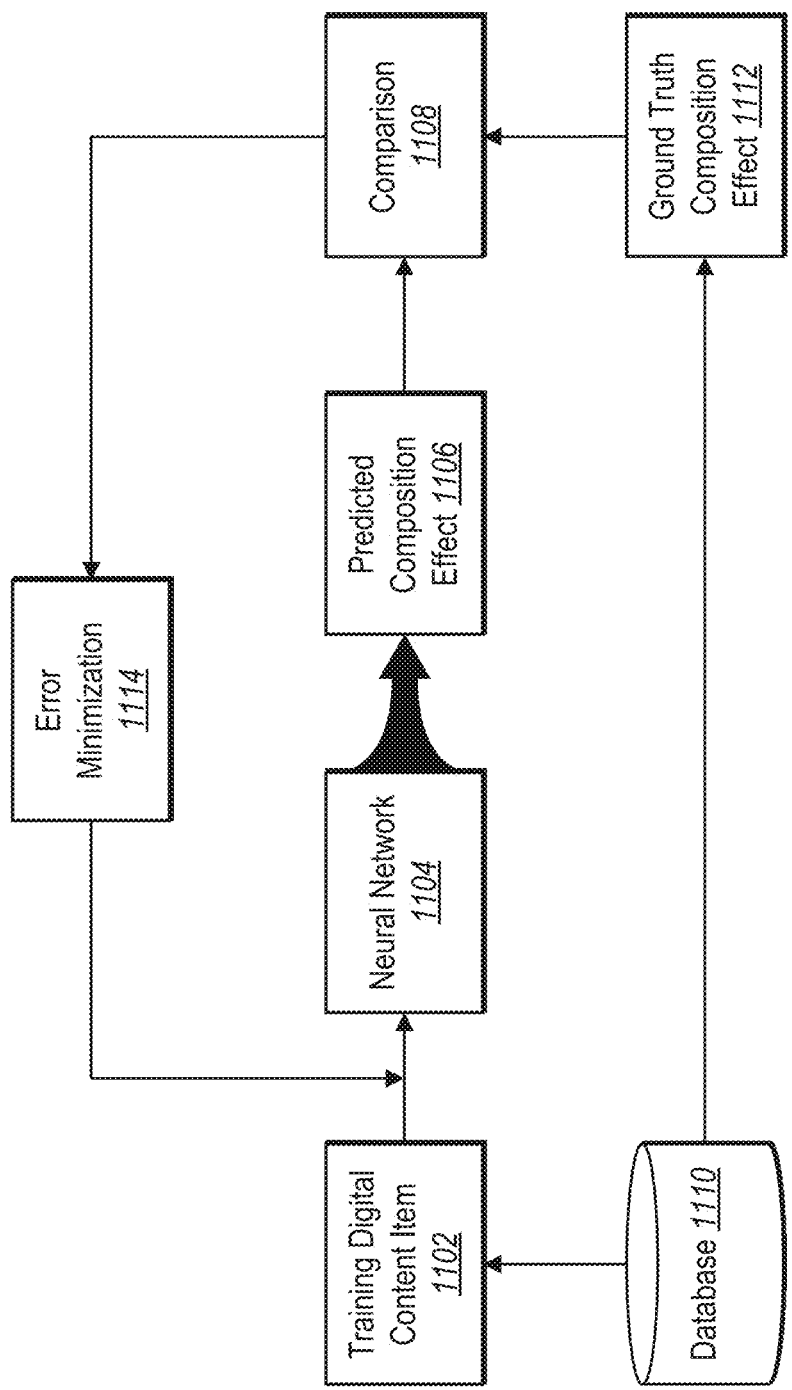
FIG. 11 illustrates an example process for training and utilizing a neural network to generate recommended composition effects in accordance with one or more implementations.

As mentioned, the composition effect tutorial system 102 can further utilize the location-aware information of the metadata composite structure to generate suggested composition effects to provide to users. FIG. 11 illustrates training a neural network 1104 to generate predicted composition effects to provide as recommendations to users. As shown, the composition effect tutorial system 102 accesses a database 1110 to obtain a training digital content item 1102.

Based on inputting the training digital content item 1102 into the neural network 1104, the composition effect tutorial system 102 can utilize the neural network 1104 to generate a predicted composition effect 1106. In addition, the composition effect tutorial system 102 can access the database 1110 to identify a ground truth composition effect 1112 that corresponds to the training digital content item 1102. For example, the composition effect tutorial system 102 determines a composition effect that is actually applied to the training digital content item 1102.

In addition, the composition effect tutorial system 102 performs a comparison 1108 to compare the predicted composition effect 1106 with the ground truth composition effect 1112. In particular, the composition effect tutorial system 102 compares the predicted composition effect 1106 neural network 1104 with the ground truth composition effect 1112 to determine a difference, error, or measure of loss between them. For example, the composition effect tutorial system 102 utilizes one or more loss functions such as a mean square error loss function, a cross-entropy loss function, a Kullback-Leibler loss function, or some other loss function.

In addition, the composition effect tutorial system 102 performs an error minimization 1114 to reduce or minimize the measure of loss between the predicted composition effect 1106 and the ground truth composition effect 1112. Particularly, the composition effect tutorial system 102 modifies one or more parameters associated with the neural network 1104 to improve its accuracy. In some implementations, the composition effect tutorial system 102 modifies parameters such as attention weights, bias terms, or other parameters. By modifying the parameters, the composition effect tutorial system 102 improves the accuracy of the neural network 1104. Thus, by repeating the process illustrated in FIG. 11, the composition effect tutorial system 102 can train or tune the neural network 1104 to generate predicted composition effects that are within a threshold error of corresponding ground truth composition effects. Indeed, the composition effect tutorial system 102 can repeatedly access training digital content items and corresponding ground truth composition effects from the database 1110 to use as training data for generating predicted composition effects using the neural network 1104.

In addition to training the neural network 1104, the composition effect tutorial system 102 can further utilize the neural network 1104 to generate recommendations for users. Indeed, the composition effect tutorial system 102 can utilize the neural network 1104 once it is trained to determine which composition effects to recommend to users based on the training data. In some implementations, however, the composition effect tutorial system 102 need not implement a neural network, but may instead monitor and record composition effects applied by previous users. The composition effect tutorial system 102 can therefore generate recommended edits or composition effects based on past composition effects. For example, the composition effect tutorial system 102 generates recommendations based on which composition effects are used most frequently, most recently, most overall, most for the same type of digital content, or most within a given window of time.

In some implementations, the composition effect tutorial system 102 may not generate recommendations to provide to users. Instead, the composition effect tutorial system 102 may receive suggested composition effects to provide to users from an external source such as a server. In these implementations, the composition effect tutorial system 102 provides the recommended composition effects that are received. Indeed, in these or other implementations the composition effect tutorial system 102 presents the recommended composition effects within a composition interface as a pop-up window, dialog box, or menu option selectable by a user to access a tutorial for implementing the recommended composition effect.

Figure 12:
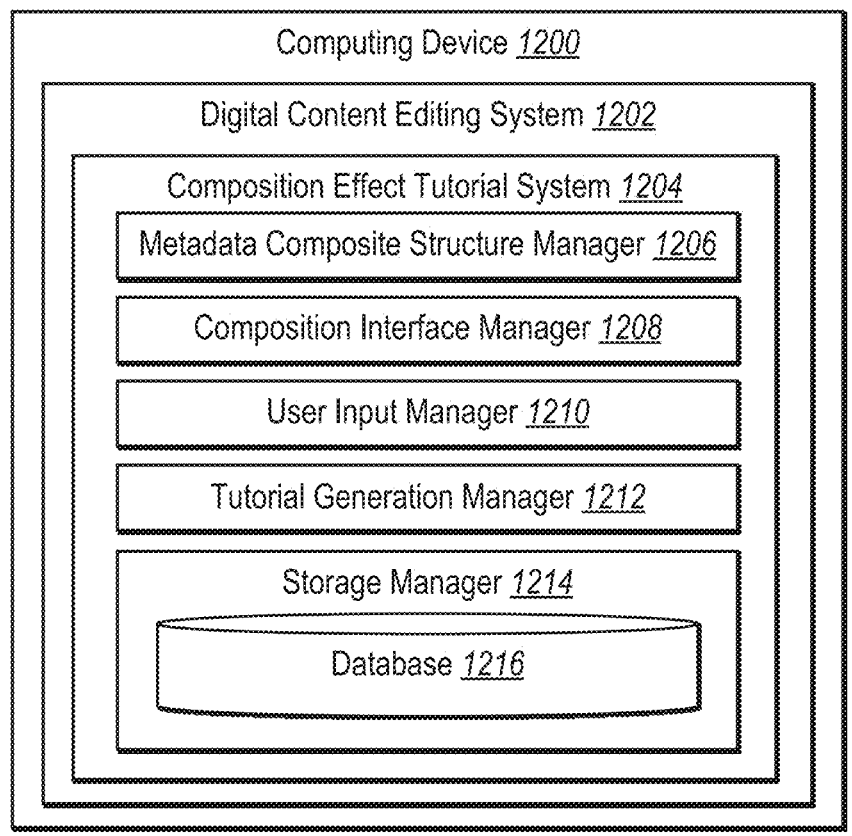
FIG. 12 illustrates a schematic diagram of a composition effect tutorial system in accordance with one or more implementations.

Looking now to FIG. 12, additional detail will be provided regarding components and capabilities of a composition effect tutorial system 1204 (e.g., an exemplary implementation of the composition effect tutorial system 102). Specifically, FIG. 12 illustrates an example schematic diagram of the composition effect tutorial system 1204 on an example computing device 1200 (e.g., one or more of the client device 108, and/or the server(s) 104). As shown in FIG. 12, the composition effect tutorial system 1204 may include a metadata composite structure manager 1206, a composition interface manager 1208, a user input manager 1210, a tutorial generation manager 1212, and a storage manager 1214.

As mentioned, the composition effect tutorial system 1204 includes a metadata composite structure manager 1206. In particular, the metadata composite structure manager 1206 can generate, access, manage, and/or maintain a metadata composite structure associated with a digital content item. For example, the metadata composite structure manager 1206 generates a metadata composite structure for a given digital content item, including nodes for various composition effects. Within each node, the metadata composite structure manager 1206 includes information such as location information, an identifier, and other composition effect attribute information as described herein. The metadata composite structure manager 1206 can create the metadata composite structure to have a hierarchical structure with some nodes as child nodes of other nodes to represent composition effects that modify other composition effects within a digital content item.

In addition, the composition effect tutorial system 1204 includes a composition interface manager 1208. In particular, the composition interface manager 1208 can present, display, manage, maintain, and/or facilitate a composition interface. For example, the composition interface manager 1208 presents a composition interface as part of a client application (e.g., the client application 110) whereby a user can create, edit, or otherwise manipulate digital content. The composition interface manager 1208 can provide various editing tools for interacting with digital content. In some implementations, the composition interface manager 1208 manages an interface for editing digital images. In other implementations, the composition interface manager 1208 manages an interface for editing digital video, digital audio, or some other form of digital content.

As shown, the composition effect tutorial system 1204 further includes a user input manager 1210. In particular, the user input manager 1210 can receive, detect, identify, or determine user input with respect to a composition interface and/or digital content. For example, the user input manager 1210 receives a user selection within a composition interface or within a digital content item. The user input manager 1210 further determines a location of the selection relative to the composition interface and/or the digital content item. For example, the user input manager 1210 can determine a pixel coordinate location as described above.

Additionally, the composition effect tutorial system 1204 includes a tutorial generation manager 1212. In particular, the tutorial generation manager 1212 can generate, provide, present, or manage a tutorial for implementing a composition effect. For example, the tutorial generation manager 1212 generates a tutorial by presenting step-by-step instructions within a composition interface. Indeed, the tutorial generation manager 1212 can place instructions within the composition interface to indicate various editing tools used to implement a composition effect.

The composition effect tutorial system 1204 further includes a storage manager 1214. In particular, the storage manager 1214 can manage or maintain a database 1216 that includes various information such as digital content, location information, training data, or other information associated with the composition effect tutorial system 1204. Indeed, one or more of the above components can communicate with the storage manager 1214 to access information stored within the database 1216. For example, the tutorial generation manager 1212 accesses training data within the database 1216 to train a neural network to generate recommended composition effects to provide to users.

In one or more implementations, each of the components of the composition effect tutorial system 1204 are in communication with one another using any suitable communication technologies. Additionally, the components of the composition effect tutorial system 1204 can be in communication with one or more other devices including one or more user client devices described above. It will be recognized that although the components of the composition effect tutorial system 1204 are shown to be separate in FIG. 12, any of the subcomponents may be combined into fewer components, such as into a single component, or divided into more components as may serve a particular implementation. Furthermore, although the components of FIG. 12 are described in connection with the composition effect tutorial system 1204, at least some of the components for performing operations in conjunction with the composition effect tutorial system 1204 described herein may be implemented on other devices within the environment.

The components of the composition effect tutorial system 1204 can include software, hardware, or both. For example, the components of the composition effect tutorial system 1204 includes one or more instructions stored on a computer-readable storage medium and executable by processors of one or more computing devices (e.g., the computing device 1200). When executed by the one or more processors, the computer-executable instructions of the composition effect tutorial system 1204 causes the computing device 1200 to perform the methods described herein. Alternatively, the components of the composition effect tutorial system 1204 comprises hardware, such as a special purpose processing device to perform a certain function or group of functions. Additionally, or alternatively, the components of the composition effect tutorial system 1204 include a combination of computer-executable instructions and hardware.

Furthermore, the components of the composition effect tutorial system 1204 performing the functions described herein may, for example, be implemented as part of a stand-alone application, as a module of an application, as a plug-in for applications including content management applications, as a library function or functions that may be called by other applications, and/or as a cloud-computing model. Thus, the components of the composition effect tutorial system 1204 may be implemented as part of a stand-alone application on a personal computing device or a mobile device. Alternatively, or additionally, the components of the composition effect tutorial system 1204 may be implemented in any application that allows creation and delivery of marketing content to users, including, but not limited to, applications in ADOBE CREATIVE CLOUD, such as ADOBE PHOTOSHOP, ADOBE PREMIERE, ADOBE LIGHTROOM, ADOBE ILLUSTATOR, and ADOBE INDESIGN. "ADOBE," "CREATIVE CLOUD," "PREMIERE," "PHOTOSHOP," "PREMIERE," "LIGHTROOM," "ILLUSTATOR," and "INDESIGN," are registered trademarks of Adobe Systems Incorporated in the United States and/or other countries.

FIGS. 1-12, the corresponding text, and the examples provide a number of different systems, methods, and non-transitory computer readable media for generating and providing dialogue responses. In addition to the foregoing, implementations can also be described in terms of flowcharts comprising acts for accomplishing a particular result. For example, FIGS. 13-14 illustrate flowcharts of example sequences of acts in accordance with one or more implementations.

Figure 13:
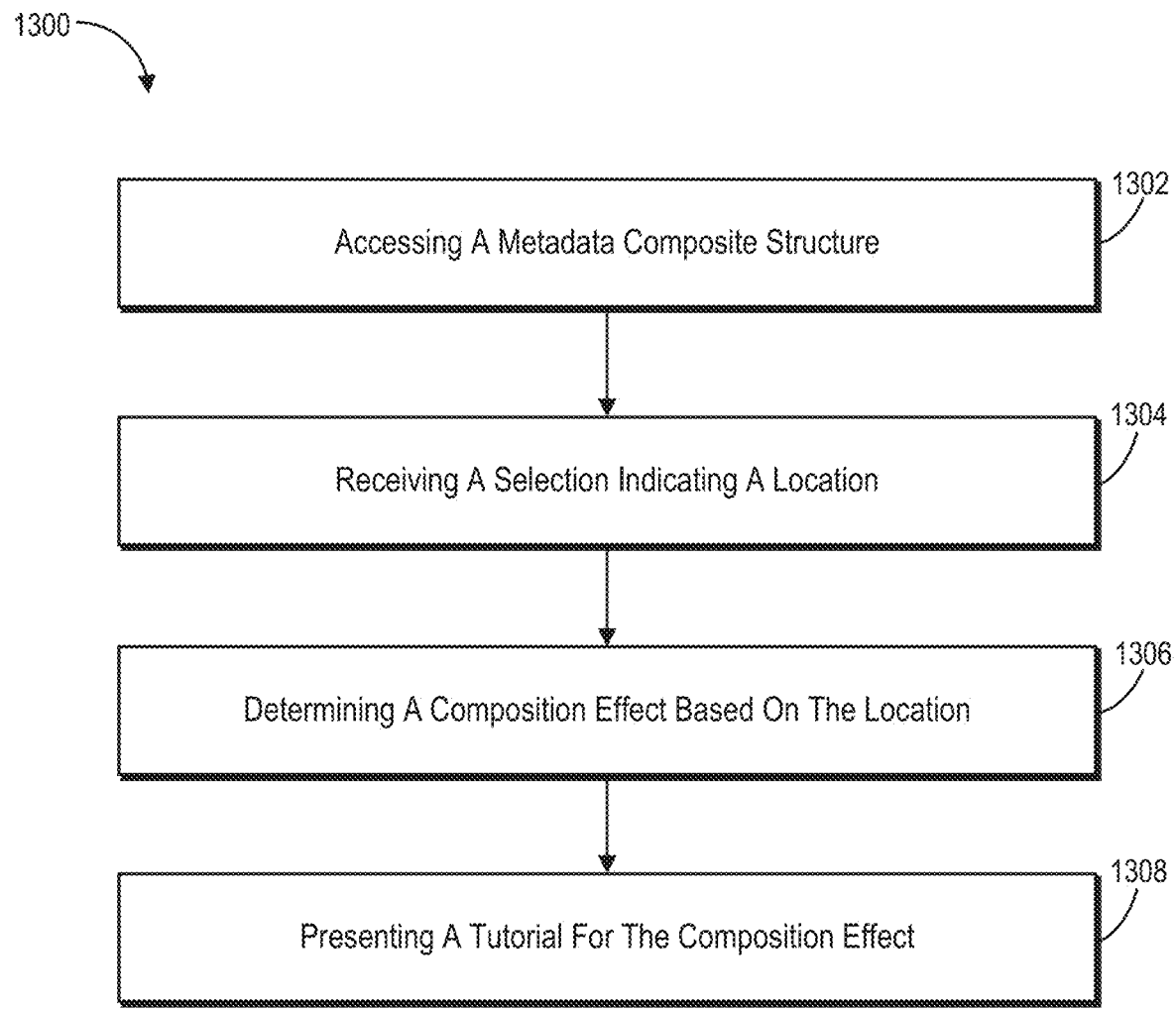
FIG. 13 illustrates a flowchart of a series of acts for accessing a tutorial for a composition effect.
Figure 14:
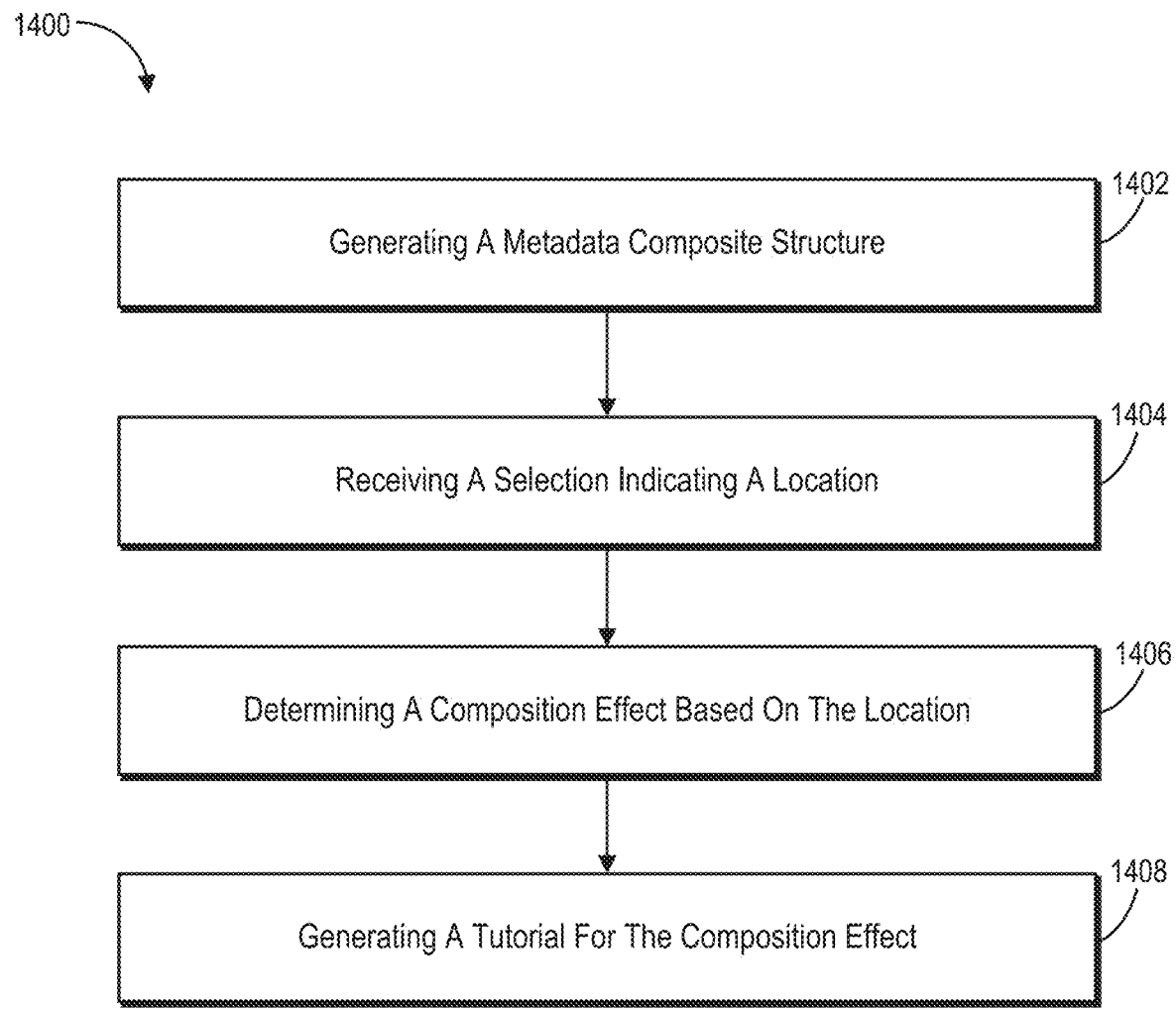
FIG. 14 illustrates a flowchart of a series of acts for generating a tutorial for a composition effect.

While FIGS. 13-14 illustrate acts according to respective implementations, alternative implementations may omit, add to, reorder, and/or modify any of the acts shown in FIGS. 13-14. The acts of FIGS. 13-14 can be performed as part of a method. Alternatively, a non-transitory computer readable medium can comprise instructions, that when executed by one or more processors, cause a computing device to perform the acts of FIGS. 13-14. In still further implementations, a system can perform the acts of FIGS. 13-14. Additionally, the acts described herein may be repeated or performed in parallel with one another or in parallel with different instances of the same or other similar acts.

FIG. 13 illustrates an example series of acts 1300 of presenting a tutorial for implementing a composition effect. As shown, the series of acts 1300 includes an act 1302 of accessing a metadata composite structure. In particular, the act 1302 involves accessing, based on one or more composition effects applied to a digital content item within a composition interface, a metadata composite structure comprising one or more nodes that correspond to the one or more composition effects, wherein a node comprises location information associated with a corresponding composition effect and further comprises an identifier associated with the corresponding composition effect. The act 1302 can further involve generating the metadata composite structure by generating, for each of the one or more composition effects associated with the digital content item, a corresponding node within the metadata composite structure.

In addition, the series of acts 1300 includes an act 1304 of receiving a selection indicating a location. In particular, the act 1304 can involve receiving a selection indicating a location within the composition interface.

As further shown, the series of acts 1300 includes an act 1306 of determining a composition effect based on the location. In particular, the act 1306 can involve determining, based on the metadata composite structure, a composition effect of the one or more composition effects that corresponds to the location of the selection within the composition interface. For example, the act 1306 further involves identifying a node within the metadata composite structure that contains location information that matches the location of the selection within the composition interface. In addition, the act 1306 can involve determining an identifier corresponding to a tool used to create the composition effect.

Additionally, the series of acts 1300 includes an act 1308 of presenting a tutorial for the composition effect. In particular, the act 1308 can involve present a tutorial for implementing the composition effect. For example, the act 1308 involves presenting, within the composition interface, step-by-step instructions to recreate the composition effect. The composition effect can include one or more of a crop, a red eye correction, a text effect, a blemish removal, a border, a warp, a swell, or a twirl.

Although not illustrated, the series of acts 1300 can further include an act of determining one or more additional composition effects that correspond to the location of the selection. In addition, the series of acts 1300 can include an act of presenting, based on receiving the selection indicating the location within the composition interface, a listing of each of the composition effects applied at the location of the selection, wherein each of the composition effects is selectable to generate a corresponding tutorial for generating the composition effect. The series of acts 1300 can further include an act of receiving a suggested composition effect for the digital content item based on composition effects made similar digital content items.

FIG. 14 illustrates an example series of acts 1400 of generating a tutorial for implementing a composition effect. As shown, the series of acts 1400 includes an act 1402 of generating a metadata composite structure. In particular, the act 1402 can involve generating, based on one or more composition effects applied to a digital content item within a composition interface, a metadata composite structure comprising one or more nodes that correspond to the one or more composition effects, wherein a node comprises location information associated with a corresponding composition effect and further comprises an identifier associated with the corresponding composition effect and/or indicating a tool used to create the composition effect.

As shown, the series of acts 1400 includes an act 1404 of receiving a selection indicating a location. In particular, the act 1404 can involve receiving, from a client device, a selection indicating a location within the composition interface.

In addition, the series of acts 1400 includes an act 1406 of determining a composition effect based on the location. In particular, the act 1406 can involve determining, based on the metadata composite structure, a composition effect of the one or more composition effects that corresponds to the location of the selection within the composition interface by identifying a node within the metadata composite structure that contains location information that matches the location of the selection within the composition interface.

As illustrated, the series of acts 1400 further includes an act 1408 of generating a tutorial for the composition effect. In particular, the act 1408 can involve generating, for display on the client device, a tutorial for implementing the composition effect. The act 1408 can involve generating, for each of the one or more composition effects associated with the digital content item, a corresponding node comprising location information indicating a location of the composition effect within the composition interface. The act 1408 can also involve generating a parent node for a given composition effect that comprises one or more constituent composition effects and generating a child node for any composition effect that is constituent to another composition effect. As described, a node can include composition effect attributes associated with a corresponding composition effect.

The series of acts 1400 can also include an act of determining one or more additional composition effects that correspond to the location of the selection. In addition, the series of acts 1400 can include an act of providing, for display on the client device and based on the selection indicating the location within the composition interface, a listing of each of the composition effects applied at the location of the selection, wherein each of the composition effects is selectable to generate a corresponding tutorial for generating the composition effect. The series of acts 1400 can include an act of generating a suggested composition effect for the digital content item based on composition effects applied to similar digital content items. Indeed, generating a suggested composition effect can involve utilizing a neural network model trained to generate predicted composition effects and/or determining, based on user behavior associated with the generated tutorial, past composition effects used by other users for the generated tutorial.

Figure 15:
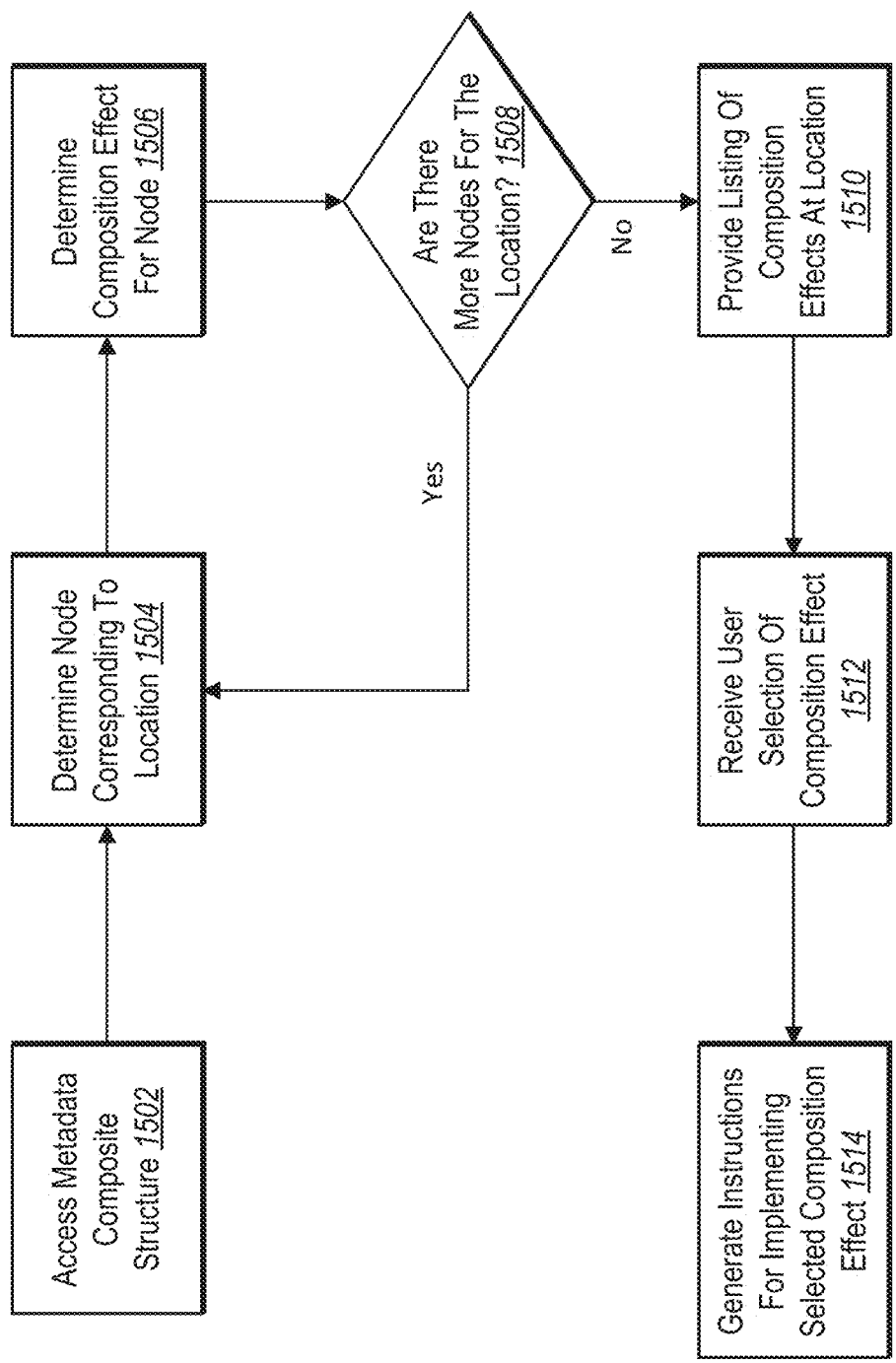
FIG. 15 illustrates a series of acts in a step for generating, for display on the client device, a tutorial for implementing a composition effect that corresponds to the location of a selection.

As mentioned, the composition effect tutorial system 102 can generate a dialogue response based on a dialogue history. Indeed, FIG. 15 illustrates exemplary acts in a step for generating, for display on the client device, a tutorial for implementing a composition effect that corresponds to the location of the selection. As illustrated, the step for generating, for display on the client device, a tutorial for implementing a composition effect that corresponds to the location of the selection can include acts 1502-1514, in addition, or alternatively, to other acts described herein.

In particular, the composition effect tutorial system 102 can perform an act 1502 to access a metadata composite structure. For example, the composition effect tutorial system 102 accesses a metadata composite structure that is pre-generated or can generate and access a new metadata composite structure in relation to a digital content item. Indeed, the composition effect tutorial system 102 can access the metadata composite structure to perform an act 1504 to determine or identify a node that corresponds to a location of a user selection within a composition interface, in accordance with this disclosure.

Based on identifying the node, the composition effect tutorial system 102 can further perform an act 1506 to determine a composition effect associated with the identified node. For instance, the composition effect tutorial system 102 determines an identifier for the corresponding node that indicates a composition effect or editing tool associated with the node. Additionally, the composition effect tutorial system 102 can perform an act 1508 to determine whether or not there are more nodes associated with the selected location. Indeed, if the composition effect tutorial system 102 identifies more than one node that include location information that includes the selected location, then the composition effect tutorial system 102 repeats acts 1504 through 1508 until all matching nodes and corresponding composition effects are identified.

Additionally, the composition effect tutorial system 102 performs an act 1510 to provide a listing of composition effects at the selected location. For example, as described above, the composition effect tutorial system 102 presents a listing of selectable composition elements that are applied at the location selected within the composition interface. Thus, the composition effect tutorial system 102 can perform an act 1512 to receive a user selection of a composition effect from the provided listing. Additionally, based on this disclosure, the composition effect tutorial system 102 can further perform an act 1514 to generate instructions for implementing the selected composition effect. Indeed, the composition effect tutorial system 102 can generate and provide a tutorial within the composition interface or by some other means as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
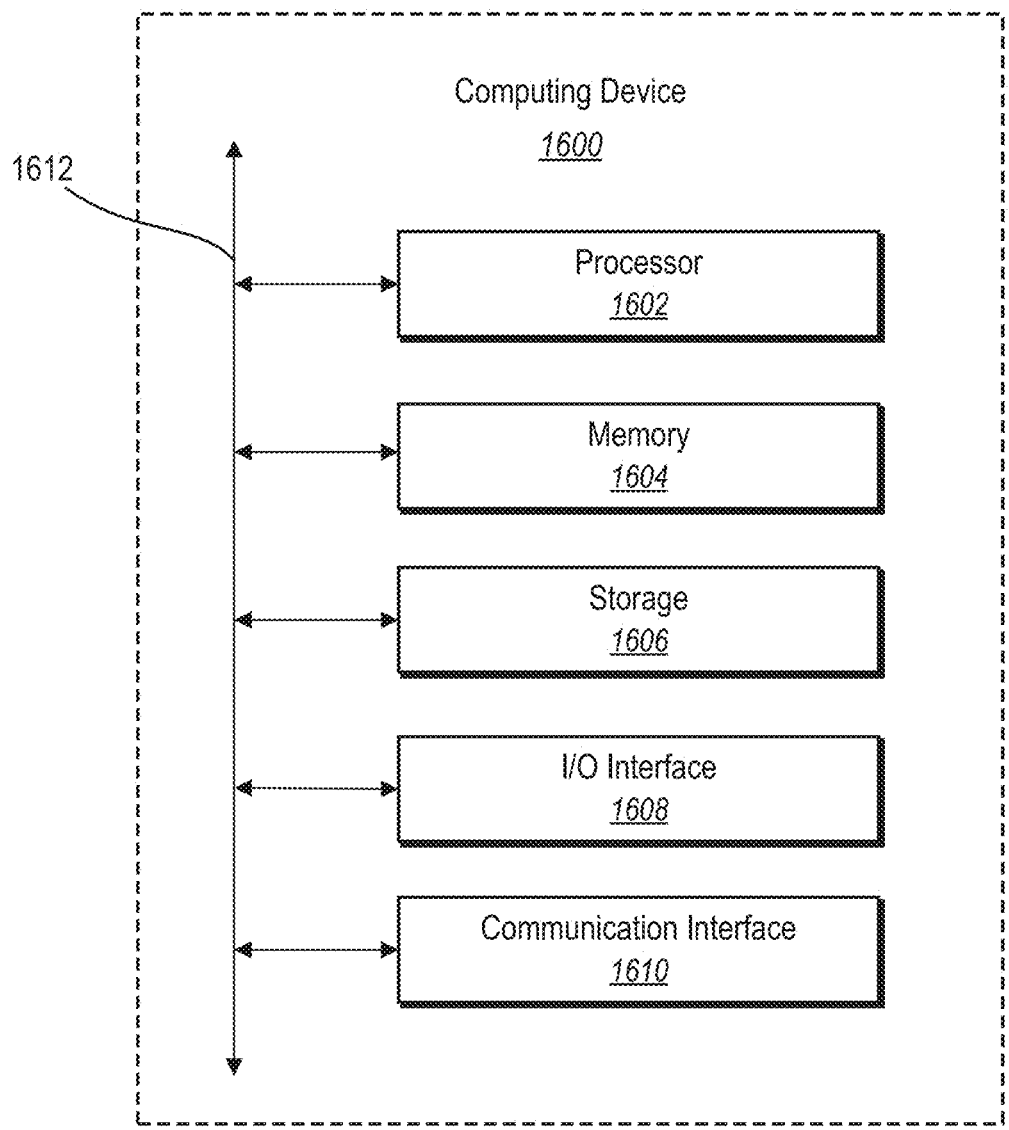
FIG. 16 illustrates a block diagram of an example computing device in accordance with one or more implementations.

FIG. 16 illustrates, in block diagram form, an example computing device 1600 (e.g., computing device 1200, client device 108, and/or server(s) 104) that may be configured to perform one or more of the processes described above. One will appreciate that the composition effect tutorial system 102 can comprise implementations of the computing device 1600. As shown by FIG. 16, the computing device can comprise a processor 1602, memory 1604, a storage device 1606, an I/O interface 1608, and a communication interface 1610. Furthermore, the computing device 1600 can include an input device such as a touchscreen, mouse, keyboard, etc. In certain implementations, the computing device 1600 can include fewer or more components than those shown in FIG. 16. Components of computing device 1600 shown in FIG. 16 will now be described in additional detail.

In particular implementations, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive (HDD), flash memory, a Universal Serial Bus (USB) drive or a combination of these or other storage devices.

The computing device 1600 also includes one or more input or output ("I/O") devices/interfaces 1608, which are provided to allow a user to provide input to (such as user strokes), receive output from, and otherwise transfer data to and from the computing device 1600. These I/O devices/interfaces 1608 may include a mouse, keypad or a keyboard, a touch screen, camera, optical scanner, network interface, modem, other known I/O devices or a combination of such I/O devices/interfaces 1608. The touch screen may be activated with a writing device or a finger.

The I/O devices/interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can comprise hardware, software, or both that couples components of computing device 1600 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for creating and editing digital content, a non-transitory computer readable medium for providing end-to-end tutorials for implementing composition effects, the non-transitory computer readable medium comprising instructions that, when executed by at least one processor, cause a computer device to:
   access, based on one or more composition effects applied to a digital content item within a composition interface, a metadata composite structure comprising one or more nodes that correspond to the one or more composition effects, wherein each node within the one or more nodes comprises location information associated with a corresponding composition effect and further comprises an identifier associated with the corresponding composition effect;
   receive a selection indicating a location within the composition interface;
   determine, based on the metadata composite structure, an output composition effect of the one or more composition effects that corresponds to the location of the selection within the composition interface by identifying a node within the metadata composite structure that contains location information that matches the location of the selection within the composition interface; and
   present a tutorial for implementing the output composition effect.

2. The non-transitory computer readable medium of claim 1, further comprising instructions that, when executed by the least one processor, cause the computer device to generate the output composition effect by utilizing a neural network model trained to generate output composition effects.

3. The non-transitory computer readable medium of claim 1, wherein the instructions cause the computer device to determine the output composition effect that corresponds to the location of the selection by further determining an identifier corresponding to a tool used to create the output composition effect.

4. The non-transitory computer readable medium of claim 1, further comprising instructions that, when executed by the at least one processor, cause the computer device to generate the metadata composite structure by generating, for each of the one or more composition effects associated with the digital content item, a corresponding node within the metadata composite structure.

5. The non-transitory computer readable medium of claim 1, further comprising instructions that, when executed by the at least one processor, cause the computer device to:
   determine one or more additional composition effects that correspond to the location of the selection; and
   present, based on receiving the selection indicating the location within the composition interface, a listing of each of the one or more additional composition effects applied at the location of the selection, wherein each of the one or more additional composition effects is selectable to generate a corresponding additional tutorial for generating the output composition effect.

6. The non-transitory computer readable medium of claim 1, further comprising instructions that, when executed by the at least one processor, cause the computer device to receive a suggested composition effect for the digital content item based on composition effects made to similar digital content items.

7. The non-transitory computer readable medium of claim 1, wherein the instructions cause the computer device to present the tutorial for implementing the output composition effect by presenting, within the composition interface, step-by-step instructions to recreate the output composition effect.

8. The non-transitory computer readable medium of claim 1, wherein the output composition effect comprises one or more of a crop, a red eye correction, a text effect, a blemish removal, a border, a warp, a swell, or a twirl.

9. A system for providing end-to-end tutorials for implementing composition effects, the system comprising:
   at least one processor; and
   a non-transitory computer readable medium comprising instructions that, when executed
   by the at least one processor, cause the system to:
      generate, based on one or more composition effects applied to a digital content item within a composition interface, a metadata composite structure comprising one or more nodes that correspond to the one or more composition effects, wherein each node of the one or more nodes comprises location information associated with a corresponding composition effect and further comprises an identifier associated with the corresponding composition effect;
      receive, from a client device, a selection indicating a location within the composition interface;
      determine, based on the metadata composite structure, an output composition effect of the one or more composition effects that corresponds to the location of the selection within the composition interface by identifying a node within the metadata composite structure that contains location information that matches the location of the selection within the composition interface; and
      generate, for display on the client device, a tutorial for implementing the output composition effect.

10. The system of claim 9, wherein the instructions cause the system to generate the metadata composite structure by generating, for each of the one or more composition effects associated with the digital content item, a corresponding node comprising location information indicating a location of each of the one or more composition effects within the composition interface.

11. The system of claim 10, wherein the instructions cause the system to generate the metadata composite structure by further determining hierarchical relationships between the one or more composition effects by:
   generating a parent node for a given composition effect that comprises one or more constituent composition effects; and
   generating a child node for any composition effect that is constituent to another composition effect.

12. The system of claim 10, wherein each node of the one or more nodes further comprises composition effect attributes associated with the corresponding composition effect.

13. The system of claim 9, further comprising instructions that, when executed by the at least one processor, cause the system to:
   determine one or more additional composition effects that correspond to the location of the selection; and
   provide, for display on the client device and based on the selection indicating the location within the composition interface, a listing of each of the one or more additional composition effects applied at the location of the selection, wherein each of the one or more additional composition effects is selectable to generate a corresponding additional tutorial for generating the output composition effect.

14. The system of claim 9, further comprising instructions that, when executed by the at least one processor, cause the system to generate a suggested composition effect for the digital content item based on composition effects applied to similar digital content items.

15. The system of claim 14, further comprising instructions that, when executed by the least one processor, cause the system to generate the suggested composition effect by utilizing a neural network model trained to generate predicted composition effects.

16. The system of claim 14, further comprising instructions that, when executed by the at least one processor, cause the system to generate the suggested composition effect by determining, based on user behavior associated with the generated tutorial, past composition effects used by other users for the generated tutorial.

17. A computer-implemented method for providing end-to-end tutorials for implementing composition effects, the computer-implemented method comprising:
   generating, based on one or more composition effects applied to a digital content item within a composition interface, a metadata composite structure comprising one or more nodes that correspond to the one or more composition effects;
   receiving, from a client device, a selection indicating a location within the composition interface; and
   determining, based on the metadata composite structure, an output composition effect of the one or more composition effects that corresponds to the location of the selection within the composition interface by identifying a node within the metadata composite structure that contains location information that matches the location of the selection within the composition interface; and
   generating, for display on the client device, a tutorial for implementing the output composition effect that corresponds to the location of the selection.

18. The computer-implemented method of claim 17, wherein generating the metadata composite structure comprises generating, for each of the one or more composition effects associated with the digital content item, a corresponding node comprising location information indicating a location of the output composition effect within the composition interface.

19. The computer-implemented method of claim 18, wherein generating the metadata composite structure further comprises generating, for each node corresponding to the one or more composition effects associated with the digital content item, a corresponding identifier indicating a tool used to create the output composition effect.

20. The computer-implemented method of claim 17, further comprising:
   determining one or more additional composition effects that correspond to the location of the selection; and
   providing, for display on the client device and based on receiving the selection indicating the location within the composition interface, a listing of each of the one or more additional composition effects applied at the location of the selection, wherein each of the one or more additional composition effects is selectable to generate a corresponding additional tutorial for generating the output composition effect.

* * * * *